US012786709B2

(12) United States Patent
Cho et al.

(10) Patent No.: US 12,786,709 B2
(45) Date of Patent: Nov. 3, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Jungyon Cho, Suwon-si (KR); Deoknam Kim, Suwon-si (KR); Jungrae Kim, Suwon-si (KR); Seungyeon Jeong, Suwon-si (KR); Hojeen Jee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 677 days.

(21) Appl. No.: 17/951,273

(22) Filed: Sep. 23, 2022

(65) Prior Publication Data

US 2023/0180001 A1 Jun. 8, 2023

Related U.S. Application Data

(63) Continuation of application No. PCT/KR2022/012040, filed on Aug. 11, 2022.

(30) Foreign Application Priority Data

Dec. 3, 2021 (KR) ........................ 10-2021-0171782

(51) Int. Cl.

| | |
|---|---|
| ***H04W 12/06*** | (2021.01) |
| ***H04W 12/73*** | (2021.01) |
| ***H04W 76/10*** | (2018.01) |

(52) U.S. Cl.

CPC ......... *H04W 12/068* (2021.01); *H04W 12/73* (2021.01); *H04W 76/10* (2018.02)

(58) Field of Classification Search

CPC ............... H04W 12/068; H04W 12/73; H04W 76/10; H04W 12/50

See application file for complete search history.

(56) References Cited

U.S. PATENT DOCUMENTS 9,107,143 B2 8/2015 Kim et al.
9,338,633 B2 5/2016 Choi et al.
(Continued)

FOREIGN PATENT DOCUMENTS

EP 3038397 A1 * 6/2016 ............. H04L 12/12
JP 2010-87913 4/2010
(Continued)

OTHER PUBLICATIONS

International Search Report dated Dec. 6, 2022 in International Patent Application No. PCT/KR2022/012040 (3 pages; 3 pages translation).
PCT/ISA/237 dated Dec. 6, 2022 in International Patent Application No. PCT/KR2022/012040 (4 pages).

*Primary Examiner* — Phy Anh T Vu
(74) *Attorney, Agent, or Firm* — STAAS & HALSEY LLP

(57) ABSTRACT

An electronic apparatus including a communication interface and a processor. The processor is configured to, based on no wireless network connection, randomly obtain identification information and a password corresponding to a wireless network through the communication interface and control a first guide User Interface (UI) to provide the identification information and the password, based on there being a wireless network corresponding to the identification information, transmit a first signal and the password to a wireless router corresponding to the wireless network through the communication interface, and based on a second signal generated according to the transmitted password being received from the wireless router through the communication interface, connect to the wireless network provided by the wireless router.

14 Claims, 28 Drawing Sheets

(56) References Cited

U.S. PATENT DOCUMENTS

| | | | | |
|---|---|---|---|---|
| 9,913,143 | B1 * | 3/2018 | Roche | H04W 12/04 |
| 10,205,776 | B2 | 2/2019 | Liang et al. | |
| 10,425,980 | B2 | 9/2019 | Jung et al. | |
| 11,044,765 | B2 | 6/2021 | Koizumi | |
| 11,582,041 | B2 | 2/2023 | Kim et al. | |
| 2009/0024550 | A1 * | 1/2009 | Wynn | H04W 12/069 707/E17.014 |
| 2010/0110921 | A1 | 5/2010 | Famolari et al. | |
| 2016/0182624 | A1 * | 6/2016 | Liang | H04L 67/1046 709/228 |
| 2017/0034700 | A1 * | 2/2017 | Cohen | H04W 12/50 |
| 2017/0164418 | A1 * | 6/2017 | Tsai | H04W 12/08 |
| 2017/0295598 | A1 * | 10/2017 | Hampel | H04W 88/06 |
| 2018/0176764 | A1 | 6/2018 | Miyashita | |
| 2018/0337956 | A1 * | 11/2018 | Sigel | H04W 12/08 |
| 2020/0037374 | A1 * | 1/2020 | Koizumi | H04W 68/005 |
| 2021/0029543 | A1 * | 1/2021 | Nam | H04W 12/06 |
| 2021/0219353 | A1 * | 7/2021 | Montemurro | H04W 76/10 |
| 2022/0046433 | A1 * | 2/2022 | Bedekar | H04W 76/10 |
| 2023/0107045 | A1 * | 4/2023 | Shet | G16Y 30/10 726/4 |

FOREIGN PATENT DOCUMENTS

| | | | | |
|---|---|---|---|---|
| JP | 6443932 | B2 | 12/2018 | |
| JP | 2020-21982 | | 2/2020 | |
| KR | 10-2016-0089270 | | 7/2016 | |
| KR | 10-1682385 | B1 | 12/2016 | |
| KR | 10-1730357 | B1 | 4/2017 | |
| KR | 10-2018-0011256 | | 1/2018 | |
| KR | 10-1907487 | B1 | 10/2018 | |
| KR | 10-2020-0026052 | A | 3/2020 | |
| WO | WO-2016101482 | A1 * | 6/2016 | H04L 63/083 |

* cited by examiner

ELECTRONIC APPARATUS AND CONTROLLING METHOD THEREOF

CROSS-REFERENCE TO RELATED APPLICATIONS

This application is a continuation application, under 35 U.S.C. § 111(a), of International Patent Application No. PCT/KR2022/012040, filed on Aug. 11, 2022, which claims priority under 35 U.S.C. 119 to Korean Patent Application No. 10-2021-0171782, filed on Dec. 3, 2021, in the Korean Intellectual Property Office, the disclosures of which are incorporated herein by reference in their entirety.

BACKGROUND

Technical Field

This disclosure relates to an electronic apparatus and a controlling method thereof and more particularly, to an electronic apparatus that provides guide information for changing identification information and a password of a wireless network and a controlling method thereof.

Description of the Related Art

In general, for a communication connection with a wireless router that provides a wireless network such as a mobile hotspot, wireless Wi-Fi, etc., identification information (name) and a password of the wireless network provided by a wireless router must be input.

For example, a user may use a wireless network connection menu in an electronic apparatus (the user's terminal device) to connect to a wireless network. When a user input for displaying the wireless network connection menu is obtained, the electronic apparatus may display a list of a plurality of wireless networks connectable from the terminal device. When a user input for selecting one of the wireless networks in the displayed list is obtained, the electronic apparatus may attempt to connect to the selected wireless network. When a password is required to connect to the wireless network, the electronic apparatus may obtain the password from the user.

However, the above-described wireless network connection method has a problem in that when there is no manipulation interface in the electronic apparatus, the user cannot directly select a wireless network or input a password.

In addition, even if there is a manipulation interface in the electronic apparatus, if the location or use of the manipulation interface is inconvenient, the user may feel uncomfortable in the process of connecting to the wireless network.

Further, even if there is a manipulation interface in the electronic apparatus, if multiple wireless networks are searched as connectable wireless networks, the user may be confused about which wireless network is to be connected among those multiple wireless networks.

The present disclosure has been made to solve the above-described problem, and an object of the present disclosure is to provide an electronic apparatus that connects to a wireless network provided by a wireless router without manipulating a menu of the electronic apparatus and a controlling method thereof.

SUMMARY

An electronic apparatus according to an embodiment includes a communication interface and a processor configured to, based on no wireless network connection, randomly obtain identification information corresponding to a wireless network and a password corresponding to the wireless network through the communication interface and control a first guide User Interface (UI) to provide the identification information and the password, based on there being a wireless network corresponding to the identification information, transmit a first signal and the password to a wireless router corresponding to the wireless network through the communication interface, and based on a second signal generated according to the transmitted password being received from the wireless router through the communication interface, connect to the wireless network provided by the wireless router.

The first guide UI may include information guiding a user to set the identification information and the password as identification information (or an identifier) and a password of the wireless network provided by the wireless router.

The password of the wireless network may be changed after the first guide UI is provided.

The password of the wireless network is transmitted to the wireless router from an external input device connected to the wireless router.

The processor may search at least one wireless network around the electronic apparatus to identify the wireless network corresponding to the identification information.

The second signal may be a signal generated when the transmitted password is consistent with a password of the wireless network, and the processor may be configured to, based on a third signal generated when the transmitted password is inconsistent with identification information of the wireless network from the wireless router through the communication interface, control to provide a second guide UI including information guiding a user to reset the password.

The apparatus may further include a memory configured to store a first group including at least one wireless network pre-connected to the electronic apparatus, and the processor may be configured to, based on there being at least one public wireless network connectable to the electronic apparatus, store information of the at least one public wireless network in the memory as a second group, based on the wireless network corresponding to the identification information, store information of the wireless network corresponding to the identification information in the memory as a third group, and identify a connectable wireless network based on at least one of the first group, the second group, or the third group.

The processor may be configured to, based on there not being a connectable wireless network in the first group, identify a connectable wireless network in the second group, and based on there not being a connectable wireless network in the second group, identify a connectable wireless network in the third group.

The processor may be configured to, based on there being at least one wireless network, obtain a similarity between the identification information and identification information of the identified at least one wireless network, based on the similarity being equal to or greater than a threshold value, control a third guide UI to provide identification information of a wireless network having the similarity equal to or greater than a threshold value, and based on a user input for selecting a wireless network being received according to the provided third guide UI, transmit the first signal and the password to a wireless router corresponding to the selected wireless network through the communication interface.

The processor may be configured to, based on there being a plurality of wireless networks having the similarity equal to greater than a threshold value, control the third guide UI to provide identification information of each of the plurality of wireless networks based on a similarity corresponding to each of the plurality of wireless networks.

A controlling method of an electronic apparatus according to an embodiment includes, based on no wireless network connection, randomly obtaining identification information and a password corresponding to a wireless network, controlling to provide a first User Interface (UI) to provide the identification information and the password, based on there being a wireless network corresponding to the identification information, transmitting a first signal and the password to a wireless router corresponding to the wireless network, and based on a second signal generated according the transmitted password being received from the wireless router through the communication interface, connecting to the wireless network provided by the wireless router.

The first guide UI may include information guiding a user to set the identification information and the password as identification information (or an identifier) and a password of the wireless network provided by the wireless router.

The password of the wireless network may be changed after the first guide UI is provided.

The password of the wireless network may be from an external input device connected to the wireless router.

The method may further include searching at least one wireless network around the electronic apparatus to identify the wireless network corresponding to the identification information.

The second signal may be a signal generated when the transmitted password is consistent with a password of the wireless network, and the method may further include, based on a third signal generated when the transmitted password is inconsistent with identification information of the wireless network from the wireless router through the communication interface, controlling to provide a second guide UI including information guiding a user to reset the password.

The apparatus may store a first group including at least one wireless network pre-connected to the electronic apparatus, and the method may further include, based on there being at least one public wireless network connectable to the electronic apparatus, storing information of the at least one public wireless network in the memory as a second group, based on the wireless network corresponding to the identification information, storing information of wireless network corresponding to the identification information in the memory as a third group, and identifying a connectable wireless network based on at least one of the first group, the second group, or the third group.

The identifying a connectable wireless network may include, based on there not being a connectable wireless network in the first group, identifying a connectable wireless network in the second group and based on there not being a connectable wireless network in the second group, identifying a connectable wireless network in the third group.

The method may further include, based on there being at least one wireless network, obtaining a similarity between the identification information and identification information of the identified at least one wireless network, based on the similarity being equal to or greater than a threshold value, controlling a third guide UI to provide identification information of a wireless network having the similarity equal to or greater than a threshold value, and based on a user input for selecting a wireless network being received according to the provided third guide UI, transmitting the first signal (or a communication connection request signal) and the password to a wireless router corresponding to the selected wireless network through the communication interface.

The controlling of a third guide UI includes, based on there being a plurality of wireless networks having the similarity equal to greater than a threshold value, control the third guide UI to provide identification information of each of the plurality of wireless networks based on a similarity corresponding to each of the plurality of wireless networks.

DETAILED DESCRIPTION

Figure 1:
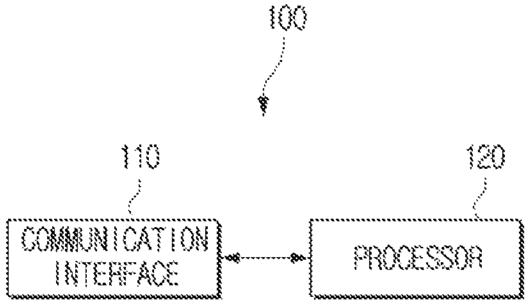
FIG. 1 is a block diagram illustrating an electronic apparatus according to an embodiment.

Hereinafter, the present disclosure will be described in detail with reference to accompanying drawings below.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

In the disclosure, an expression "have", "may have", "include", "may include", or the like, indicates an existence of a corresponding feature (for example, a numerical value, a function, an operation, a component such as a part, or the like), and does not exclude an existence of an additional feature.

The expression "at least one of A and/or B" should be understood to represent either "A" or "B" or any one of "A and B."

Expressions such as "first," or "second," used in the disclosure may modify various components regardless of order and/or importance, and are used to distinguish one component from another component, and do not limit the corresponding components.

When it is mentioned that any component (e.g., a first component) is (operatively or communicatively) coupled with/to or is connected to another component (e.g., a second component), it is to be understood that any component is directly coupled to another component or may be coupled to another component through another component (e.g., a third component).

Singular expressions include plural expressions unless the context clearly indicates otherwise. It should be further understood that the term "include" or "constituted" used in the application specifies the presence of features, numerals, steps, operations, components, parts mentioned in the specification, or combinations thereof, but do not preclude the presence or addition of one or more other features, numerals, steps, operations, components, parts, or combinations thereof.

In the disclosure, a 'module' or a 'unit' may perform at least one function or operation, and be implemented by hardware or software or be implemented by a combination of hardware and software. In addition, a plurality of 'modules' or a plurality of 'units' may be integrated in at least one module and be implemented as at least one processor (not illustrated) except for a 'module' or an 'unit' that needs to be implemented by specific hardware.

In the disclosure, a term "user" may be a person that uses an electronic apparatus or a device that uses an electronic apparatus (e.g., an artificial intelligence electronic apparatus).

Hereinafter, an embodiment of the present disclosure will be described in detail with reference to accompanying drawings.

FIG. 1 is a block diagram illustrating an electronic apparatus 100 according to an embodiment.

Referring to FIG. 1, the electronic apparatus 100 may include a communication interface 110 and a processor 120.

The electronic apparatus 100 according to various embodiments may be an apparatus the communication interface 100 connectable to a wireless network.

According to an embodiment, the electronic apparatus 100 may be an apparatus that does not include a manipulation interface for connecting to a wireless network. For example, the electronic apparatus 100 may include at least one of a projector including a projection unit or a set-top box.

According to another embodiment, the electronic apparatus 100 may be an apparatus including a manipulation interface for connecting to a wireless network. For example, the electronic apparatus 100 may include at least one of a smartphone, a tablet PC, a mobile phone, a desktop PC, a laptop PC, a PDA, or a portable multimedia player (PMP). In some embodiments, the electronic apparatus 100 may include, for example, at least one of a television, a digital video disk (DVD) player, or a media box (e.g., Samsung HomeSync™ Apple TV™, or Google TV™).

The communication interface 100 is configured to perform communication with various types of external devices according to various types of communication methods. The communication interface 110 may include a wireless communication module or a wired communication module. Here, each communication module may be implemented in the form of at least one hardware chip.

The wireless communication module may be a module that performs communication with an external device wirelessly. For example, the wireless communication module may include at least one of a WiFi module, a Bluetooth module, an infrared communication module, or other communication modules.

The WiFi module and the Bluetooth module perform communication through a WiFi method and a Bluetooth method, respectively. When using the WiFi module or the Bluetooth module, various connection information such as SSID, session keys, etc. are transmitted and received first, and various information can be transmitted and received after communication is established using the same.

The infrared communication module performs communication according to an infrared Data Association (IrDA)

technology using infrared light which lies between visible light and millimeter waves for short-distance wireless data transmission Other communication modules may include at least one communication chip that performs communication according to various wireless communication standards such as Zigbee, 3rd generation (3G), 3rd generation partnership project (3GPP), long term evolution (LTE), LTE Advanced (LTE-A), 4th generation (4G), and 5th generation (5G), etc.

The wired communication module may be a module that performs communication with an external apparatus via cable. For example, the wired communication module may include at least one of a local area network (LAN) module, an Ethernet module, a pair cable, a coaxial cable, an optical fiber cable, or an Ultra Wide-Band (UWB) module.

The processor 120 may perform overall control operations of the electronic apparatus 100. Specifically, the processor 120 controls the overall operations of the electronic apparatus 100.

The processor 120 may be implemented as a digital signal processor (DSP) for processing digital image signals, a microprocessor, or a time controller (TCON), but is not limited thereto. The processor 120 may include at least one of a central processing unit (CPU), a micro controller unit (MCU), a micro processing unit (MPU), a controller, an application processor (AP), a communication processor (CP) or an ARM processor, or may be defined as the corresponding term. Further, the processor 120 may be implemented as a System on Chip (SoC) integrated with a processing algorithm, a large scale integration (LSI), or in the form of a field programmable gate array (FPGA). In addition, the processor 120 may perform various functions by executing computer executable instructions stored in a memory 130.

When (or when it is identified) the processor 120 is not connected to a wireless network through the communication interface 110, the processor 120 may randomly obtain identification information and a password related to the wireless network, control (or output) to provide a first guide User Interface (UI) including the identification information and the password, when (or when identifying) there is a wireless network corresponding to the identification information, the processor 120 transmits a first signal (or a communication connection request signal) and a password to a wireless router 200, and if a second signal (or a response signal) based on the transmitted password is received from the wireless router 200 through the communication interface 110, a wireless network provided by the wireless router 200 may be connected.

Here, when power is supplied to the electronic apparatus 100, the processor 120 may search a wireless network in order to attempt to connect to the wireless network. In addition, the processor 120 may identify whether the wireless network is connected after a threshold time (e.g., 30 seconds) has elapsed.

Here, when it is identified that a wireless network is connected, the processor 120 may perform a communication connection through the wireless network without performing any separate operation.

Here, when it is identified that a wireless network is not connected, the processor 120 may perform a predetermined operation to connect to a wireless network. For example, the operation identified as not being connected to a wireless network may occur in a situation in which a pre-connected wireless network is not searched, a password of the pre-connected wireless network is changed, or the electronic apparatus 100 is in an initialization state.

Accordingly, the processor 120 may perform an operation for connecting to the wireless router 200 intended by a user. In general, the user may directly input setting information (identification information, a password) of the wireless network provided by the wireless router 200. However, when a plurality of wireless networks are searched in the electronic apparatus 100, it would be difficult for the user to know the name of the wireless network provided by the wireless router 200 that the user wants to use.

Thus, the processor 120 may generate (or obtain) arbitrary identification information and password and guide the user to change the setting information of the wireless router 200 that the user wants to use to the generated identification information and password.

Specifically, the processor 120 may randomly generate identification information and a password related to the wireless network. Here, the randomly generating operation may mean the operation of randomly generating identification information and a password. The processor 120 may generate identification information and a password within a predetermined number of characters so that the user can easily recognize it.

Here, the identification information and password related to the wireless network may mean setting information to be input to the wireless network of the wireless router 200 that the user wants to use.

For example, when the electronic apparatus 100 is not connected to a wireless network, the processor 120 may randomly generate “sam” as identification information and “sung123” as a password. This is only an example, and the generation result may be different whenever identification information and a password are generated.

Subsequently, the processor 120 may output the generated identification information and password. Specifically, the processor 120 may generate (or obtain) a first guide UI including the identification information and password. The processor 120 may output the first guide UI. Here, the outputting method may vary depending on the type of the electronic apparatus 100.

According to an embodiment, the electronic apparatus 100 may include a projection unit. For example, the electronic apparatus 100 may be a projector that projects (or output) an image. Here, the processor 120 may project the first guide UI on a projection surface using the projection unit. Meanwhile, the processor 120 may project various guide UIs or images on the projection surface using the projection unit.

Here, the projection unit may perform the function of controlling (or outputting) to provide an image on the projection surface. The projection unit may output an image to be control (or output) to be provided by the electronic apparatus 100 on the projection surface. The projection unit may include a projection lens.

Here, although a projection unit is described as an example, the electronic apparatus 100 may project an image in various ways. Here, the projection surface may be a part of a physical space in which the image is output or a separate screen. Here, the projection unit may be configured to project the image to the outside. The projection unit according to an embodiment may be implemented in various methods (e.g., cathode-ray (CRT) method, Liquid Crystal Display (LCD) method, a Digital Light Processing (DLP) method, laser method, etc.).

According to another embodiment, the electronic apparatus 100 may include a display. For example, the electronic apparatus 100 may be a TV, a smartphone, a tablet, or a PC including an image. Alternatively, the electronic apparatus 100 may be various home appliances including a display. For example, the electronic apparatus 100 may be a refrigerator, a washing machine, a dryer, a vacuum cleaner, a robot cleaner, a dish washing machine, an air conditioner, or a speaker that displays an image.

Here, the processor 210 may display (or output) the first guide UI through the display. In addition, the processor 120 may display various guide UIs or images using the display.

When the processor 120 outputs the first guide UI, the user may recognize the provided (or output) first guide UI. Here, after recognizing the provided (or output) first guide UI, the user may change the setting information of a wireless network to be used based on identification information and a password included in the first guide UI.

Here, the setting information may include identification information and a password.

The apparatus that provides a wireless network to be used may be the wireless router 200. The wireless network provided by the wireless router 200 may include the identification information (first identification information) and password (first password) pre-stored by the manufacturer of the wireless router 200.

Here, the user may change the setting information of the wireless network using the identification information (second identification information) generated by the electronic apparatus 100 and the password (second password) generated by the electronic apparatus 100. Specifically, the user may change the first identification information and the first password preset in the wireless router 200 to the second identification information and the second password generated by the electronic apparatus 100.

Here, after outputting the first guide UI, the processor 120 may search a wireless network corresponding to the generated identification information. Specifically, the processor 120 may search at least one wireless network recognizable through the communication interface 110, and identify a wireless network having identification information that is identical (or similar) to the generated identification information from among the searched wireless networks.

Here, when there is (or when identifying or searching) a wireless network corresponding to the identification information, the processor 120 may transmit a first signal (or a communication connection request signal) and the generated password to the wireless router 200 corresponding to the identified (or searched) wireless network.

Here, the wireless router 200 may receive the first signal (or a communication connection request signal) and password from the electronic apparatus 100. When the first signal (or a communication connection request signal) is received, the wireless router 200 may identify whether the received password matches the password of the wireless network provided by the wireless router 200. If the user does not change the identification information and password of the wireless network provided by the wireless router 200, the wireless router 200 may identify that the password does not match. If the user changes the identification information and password of the wireless network provided by the wireless router 200, the wireless router 200 may identify that the password matches. Specifically, the wireless router 200 may determine whether the preset password matches the password newly received from the electronic apparatus 100.

Here, the wireless router 200 may generate a second signal (or a response signal) based on the password transmitted (or received) from the electronic apparatus 100. Specifically, when the preset password and the password newly received from the electronic apparatus 100 are matched to each other, the wireless router 200 may generate a password match response signal (a first response signal). When the preset password and the password newly received from the electronic apparatus 100 are not matched to each other, the wireless router 200 may generate a password mismatch response signal (a second response signal or a third signal). Here, the wireless router 200 may transmit a response signal (the first response signal or the second response signal) to the electronic apparatus 100.

Here, the password match response signal (the first response signal) is received from the wireless router 200, the processor 120 may connect to the wireless network provided by the wireless router 200. Here, when the password mismatch response signal (the second response signal or the third signal) is received from the wireless router 200, the processor 120 may output the second guide UI to reset a password.

For example, it is assumed that the electronic apparatus 100 generates "sam" as identification information and "sung123" as a password. The electronic apparatus 100 may output the first guide UI including the identification information (sam) and the password (sung123). In addition, the user may change the setting information of the wireless network to be connected based on the identification information (sam) and the password (sung 123) through the first guide UI. After the first guide UI is provided (or output), the electronic apparatus 100 may identify a wireless network corresponding to identification information that is identical (or similar) to "sam." Subsequently, the electronic apparatus 100 may identify the wireless router 200 that provides a wireless network corresponding to the identification information of "sam" (or identification information similar to "sam). Then, the electronic apparatus 100 may transmit the first signal (or a communication connection request signal) and the password (sung123) to the identified wireless router 200. When the password (sung123) transmitted by the electronic apparatus 100 is consistent with the password (sung123) changed by the user, the wireless router 200 may generate a password match response signal (the first response signal or the second signal). Subsequently, the wireless router 200 may transmit the password match response signal (the first response signal or the second signal) to the electronic apparatus 100. When receiving the password match response signal (the first response signal or the second signal) from the wireless router 200, the electronic apparatus 100 may connect to the wireless network.

Meanwhile, the first guide UI may include information guiding the user to set identification information and a password as the identification information and password of the wireless network provided by the wireless router 200.

Here, the first guide UI may include content requesting that the user directly change the setting information of the wireless network. Here, the setting information of the wireless network may include identification information and a password. Here, the identification information and a password corresponding to a wireless network may mean the identification information and password of the wireless network provided by the wireless router 200. The first guide UI may include at least one of a UI requesting to set the identification information and password of a wireless network to be connected or a UI including the identification information and password of the wireless network. The specific description regarding the first guide UI will be illustrated in detail in a guide UI 800 of FIG. 8.

Meanwhile, the password of the wireless network provided by the wireless router may be a password that is changed after the first guide UI is provided (or output).

Here, the password of the wireless network may be changed by the user. The user may change the password of the wireless network by recognizing the first guide UI provided (or output) by the electronic apparatus 100. Accordingly, the time when the setting information of the wireless network is changed may be after the first guide UI is provided (or output). Consequently, the identification information and password of the wireless network may be changed after the first guide UI is provided (or output).

A method for the user to change the setting information of the wireless network provided by the wireless router 200 may vary depending on whether the wireless router 200 includes a manipulation interface. Here, the manipulation interface may mean a button, a touch display, etc. capable of obtaining a user input.

According to an embodiment, the wireless router 200 may not include a manipulation interface for inputting a password. For example, the wireless router 200 may not include a manipulation interface for inputting a separate text, such as a home internet router.

Here, the wireless router 200 may perform a communication connection with an external input device 300 to change the setting information of the wireless network provided by the wireless router 200. The user may change the setting information of the wireless network provided by the wireless router 200 through the manipulation interface of the external input device 300. For example, when identification information and a password are obtained through the manipulation interface of the external input device 300, the external input device 300 may transmit the obtained identification information and password to the wireless router 200. When the identification information and password are received from the external input device 300, the wireless router 200 may change the existing setting information based on the received identification information and password. The operation of changing the existing setting information may mean changing the identification information and password of the wireless network provided by the wireless router 200 to the identification information and password input from the external input device 300.

The description regarding the electronic apparatus 100 that does not include a manipulation interface will be illustrated in detail in FIGS. 3, 4, 11 and 12.

According to another embodiment, the wireless router 200 may include a manipulation interface for inputting a password. For example, the wireless router 200 may include a manipulation interface for inputting a separate text, such as a smartphone.

Here, identification information and a password may be obtained through the manipulation interface of the wireless router 200. When identification information and a password are obtained through the manipulation interface of the wireless router 200, the wireless router 200 may change the existing setting information based on the obtained identification information and password. The operation of changing the existing setting information may mean changing the identification information and password of the wireless network provided by the wireless router 200 to the identification information and password input from the wireless router 200.

Meanwhile, in an embodiment in which the wireless router 200 does not include a manipulation interface, the password of the wireless network provided by the wireless router may be a password transmitted to the wireless router 200 from the external input device 300 that is communicatively connected to the wireless router 200.

The description regarding the external input device 300 will be illustrated in detail in FIGS. 4, 6, 12, 16, and 17.

Meanwhile, the processor 120 may search at least one wireless network around the electronic apparatus 100 to identify a wireless network corresponding to identification information.

Here, after the first guide UI is provided (or output), the processor 120 may identify a wireless network having identification information that is identical (or similar) to the generated identification information. Specifically, after the first guide UI is provided (or output), the processor 120 may search at least one wireless network recognized around the electronic apparatus 100. Subsequently, the processor 120 may identify a wireless network having identification information that is identical (or similar) to the generated identification information from among the searched at least one wireless network.

Meanwhile, the first signal (or the response signal) is a signal generated when the transmitted password is identical to the password of the wireless network, and when receiving the third signal (or the second response signal) generated when the password transmitted from the wireless router 200 through the communication interface 110 does not match the identification information of the wireless network, the processor 120 may output the second guide UI including information guiding the user to reset the password.

Here, the wireless router 200 may compare the password received from the electronic apparatus 100 with the changed password of the wireless network provided by the wireless router 200. When the changed password of the wireless network matches the password received from the electronic apparatus 100, the wireless router 200 may generate the first response signal (or the second signal). Here, the first response signal (or the second signal) may be a password match response signal.

When the changed password of the wireless network does not match the password received from the electronic apparatus 100, the wireless router 200 may generate the second response signal (or the third signal). Here, the second response signal (or the third signal) may be a password mismatch response signal.

When the electronic apparatus 100 receives the first response signal (or the second signal) from the wireless router 200, the processor 120 may communicatively connect to the wireless network provided by the wireless router 200.

When the electronic apparatus 100 receives the second response signal (or the third signal) from the wireless router 200, the processor 120 may output the second guide UI. Here, the second guide UI may include content requesting the user to reset the password of the wireless network. Specifically, the second guide UI may include at least one of a UI requesting the user to set the identification information and password of the wireless network to be connected, a UI including the identification information and password of the wireless network, a UI including information that the password does not match, or a UI including information requesting the user to reset the password.

Figure 8:
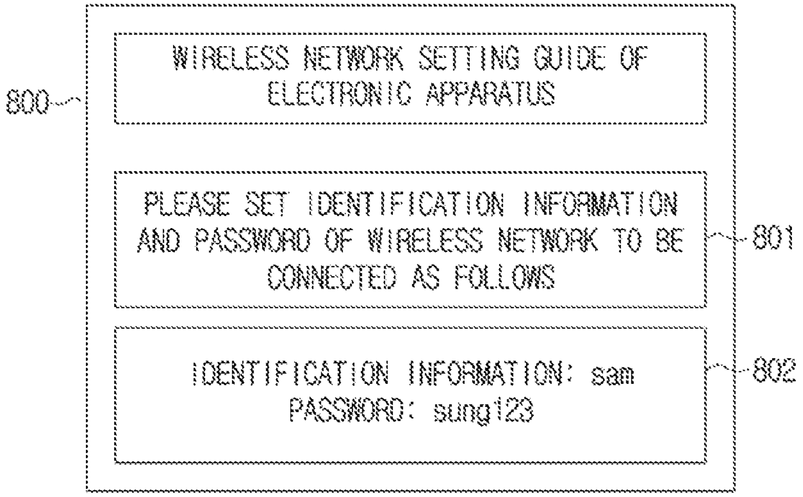
FIG. 8 is a view provided to explain a guide UI output by an electronic apparatus according to an embodiment.
Figure 8:
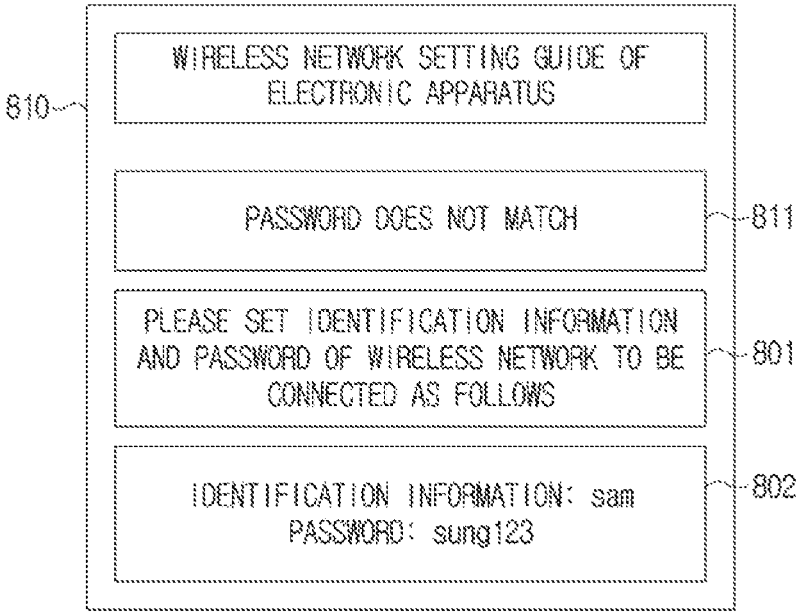

Here, the specific description regarding the second guide UI will be illustrated in detail in a guide UI 810 of FIG. 8.

Meanwhile, the memory 130 that stores a first group including at least one wireless network pre-connected to the electronic apparatus 100 is further included, and when there is (or when identifying) at least one public wireless network connectable to the electronic apparatus 100, the processor 120 may store the at least one public wireless network in the memory 130 as a second group, and when there is (or when identifying) a wireless network corresponding to identification information, the processor 120 may store the wireless network corresponding to identification information in the memory 130 and identify a connectable wireless network based on at least one of the first group, the second group or the third group.

Here, the electronic apparatus 100 may control the wireless network based on the plurality of groups. A wireless network that has been connected to the electronic apparatus 100 at least once may be included and stored in the first group. Accordingly, the wireless network included in the first group is a network that has been connected to the electronic apparatus 100, and the setting information of the wireless network may be stored. Here, the setting information may include at least one of identification information, a password or device information (e.g., wireless router information) providing the wireless network.

Here, while the setting information of the pre-connected wireless network is stored in the memory 130 of the electronic apparatus 100, the processor 120 may search wireless networks around the electronic apparatus 100. The processor 120 may identify a public wireless network among the searched wireless networks. Here, the public wireless network may mean a network that can be connected by anyone without inputting a password. Here, when there is (or when identifying) a public wireless network, the processor 120 may store the identified public wireless network as the second group.

Here, the processor 120 may identify a wireless network having identification information that is identical (or similar) to randomly generated identification information. The processor 120 may store the wireless network having identification information that is identical (or similar) to the generated identification information as the third group.

Here, the processor 120 may determine a wireless network to be connected based on the first group (pre-connected wireless network), the second group (public wireless network) and the third group (wireless network of the generated identification information).

Here, the processor 120 may determine one wireless network based on the priority of each group.

According to an embodiment, the priority of the first group may be the highest, and the priority of the second group may be the higher than that of the third group.

Meanwhile, when (or if it is identified) there is no connectable wireless network in the first group, the processor 120 may identify a connectable wireless network in the second group, and when (or if it is identified) there is no connectable wireless network in the second group, the processor 120 may identify a connectable wireless network in the third group.

According to another embodiment, the priority of the first group may be the highest, and the priority of the third group may be higher than that of the second group.

When (or if it is identified) there is no connectable wireless network in the first group, the processor 120 may identify a connectable wireless network in the third group, and when (or if it is identified) there is no connectable wireless network in the second group, the processor 120 may identify a connectable wireless network in the second group.

Figure 20:
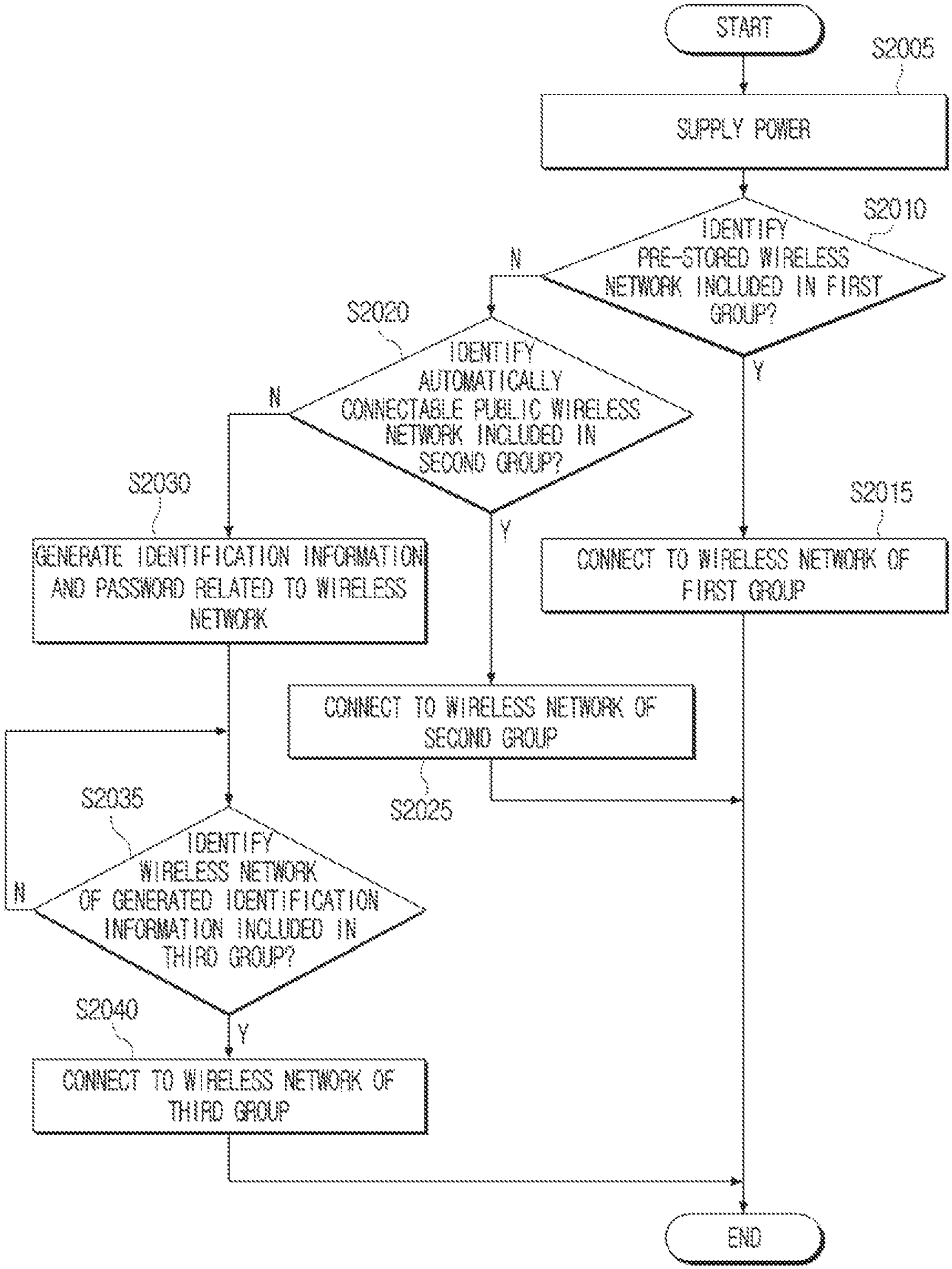
FIG. 20 a flowchart provided to explain an operation of dividing a wireless network into a plurality of groups according to an embodiment.
Figure 21:
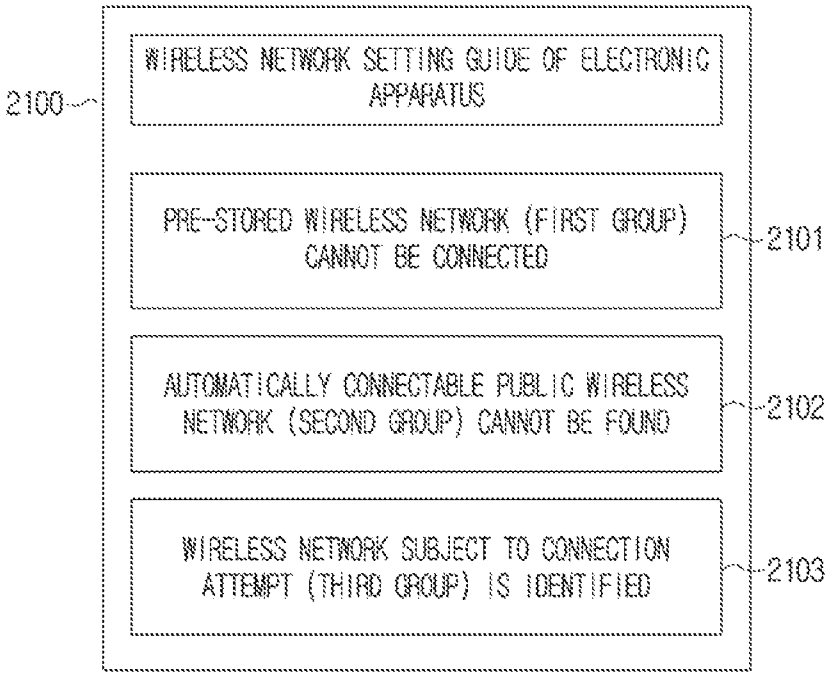
FIG. 21 is a view provided to explain a guide UI indicating whether a wireless network included in a plurality of groups is connected according to an embodiment.

The operation of determining a wireless network based on a plurality of groups will be illustrated in detail in FIGS. 20 and 21.

Meanwhile, when there is no wireless network corresponding to the generated identification information, the processor 120 may obtain a similarity between the generated identification information and the identification information of at least one connectable wireless network. When the obtained similarity is equal to or higher than a threshold value, the processor 120 may output a guide UI requesting to confirm the identification information of the wireless network. When a wireless network having a similarity equal to or greater than the threshold value although not identical is identified, the processor 120 may determine that the user has incorrectly input part of the identification information. Accordingly, in order to guide the user to input the identification information again, the processor 120 may output a guide UI requesting the user to confirm the identification information of the wireless network. Here, the guide UI may be a guide UI 1910 of FIG. 19.

Meanwhile, when (or if it is identified) there is at least one wireless network, the processor 120 may obtain a similarity between identification information (randomly generated identification information) and the identification information of the identified at least one wireless network (identification information of the searched wireless network), when the similarity is equal to or greater than a threshold value, the processor 120 may control (or output) to provide the third guide UI including the identification information of the wireless network having the similarity equal to or greater than the threshold value, and when a user input for selecting a wireless network to be connected is received according to the provided (or output) third guide UI, the processor 120 may transmit the first signal (or a communication connection request signal) and a password to the wireless router 200 corresponding to the selected wireless network through the communication interface 110.

Here, the processor 120 may search a wireless network around the electronic apparatus 100. Here, the search operation may mean a wireless network in which a connection attempt is possible regardless of whether the password matches. The processor 120 may obtain the identification information of the searched wireless network. In addition, the processor 120 may compare the identification information of the searched wireless network with randomly generated identification information. The processor 120 may obtain a similarity between the identification information of the searched wireless network and the randomly generated identification information.

Here, the processor 120 may determine whether the similarity is equal to or greater than a threshold value. When the similarity is less than the threshold value, the processor 120 may determine that the searched wireless network is not a network intended by the user. Accordingly, the processor 120 may not connect to the searched wireless network.

When the similarity is equal to or greater than the threshold value, the processor 120 may determine that the searched wireless network is the network intended by the user.

In a situation where the similarity is equal to or greater than the threshold value, there may be various methods for the processor 120 to connect to the searched wireless network.

According to an embodiment, the processor 120 may connect to the searched wireless network by further obtaining a user input. For example, the processor 120 may generate the third guide UI including content asking the user whether to connect to the searched wireless network and output the generated third guide UI. When receiving a user input for selecting a wireless network to be connected according to the third guide UI, the processor 120 may connect to the searched wireless network.

According to another embodiment, the processor 120 may automatically connect to the searched wireless network without a user input.

Meanwhile, the processor 120 may determine whether to connect to a wireless network using a first threshold value and a second threshold value.

Specifically, when the similarity is equal to or greater than the first threshold value, the processor 120 may automatically connect to the searched wireless network without a separate user input. Here, if the similarity is less than the first threshold value and equal to or greater than the second threshold value, the processor 120 may control (or output) to provide the third guide UI requesting a user input and connect to the searched wireless network when a user input is obtained according to the third guide UI. Here, when the similarity is less than the second threshold value, the processor 120 may not connect to the searched wireless network.

Figure 18:
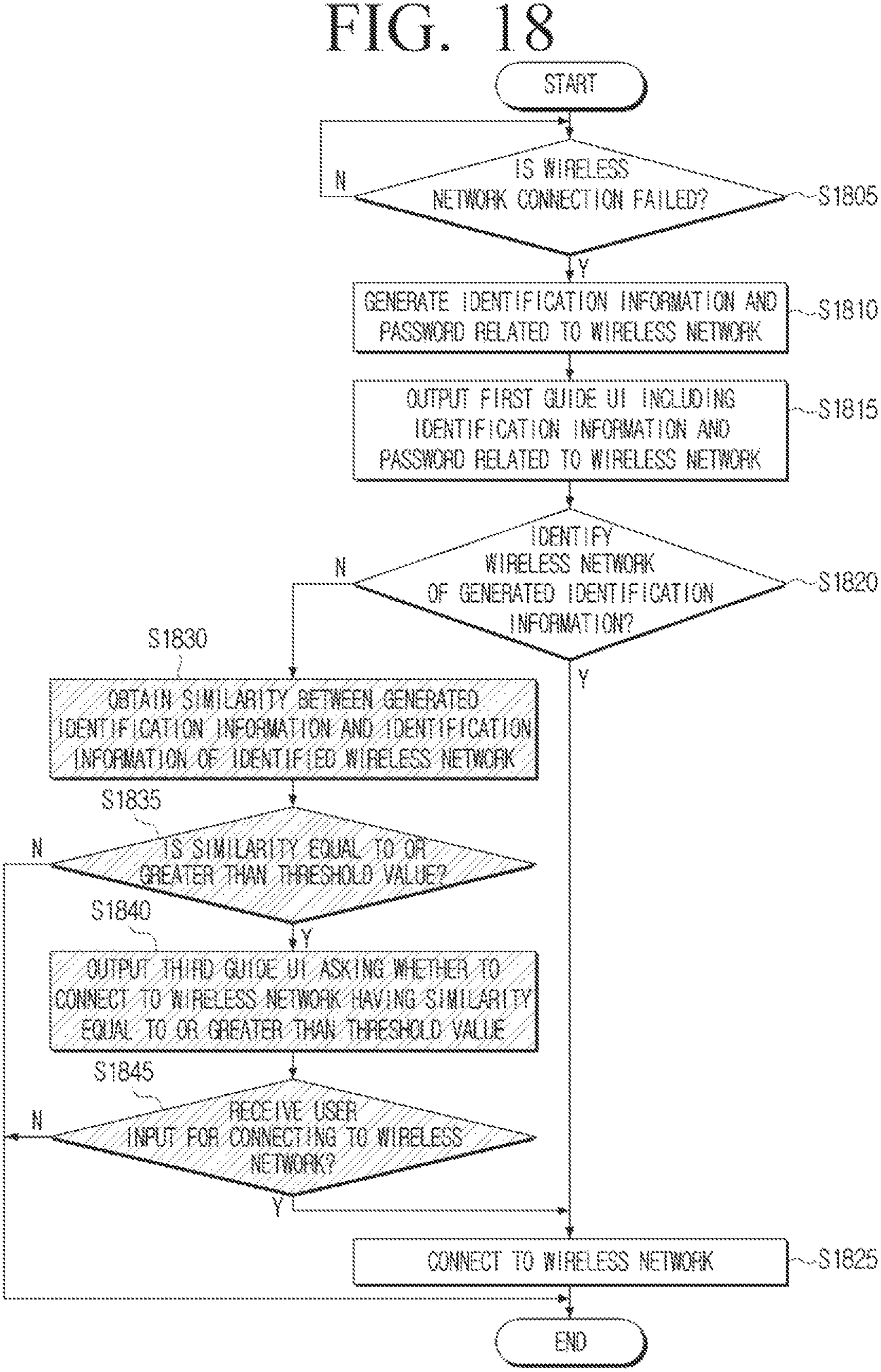
FIG. 18 is a flowchart provided to explain an operation of connecting to a wireless router using a similarity between identification information that is randomly generated and identification information of a searched wireless network according to an embodiment.
Figure 19:
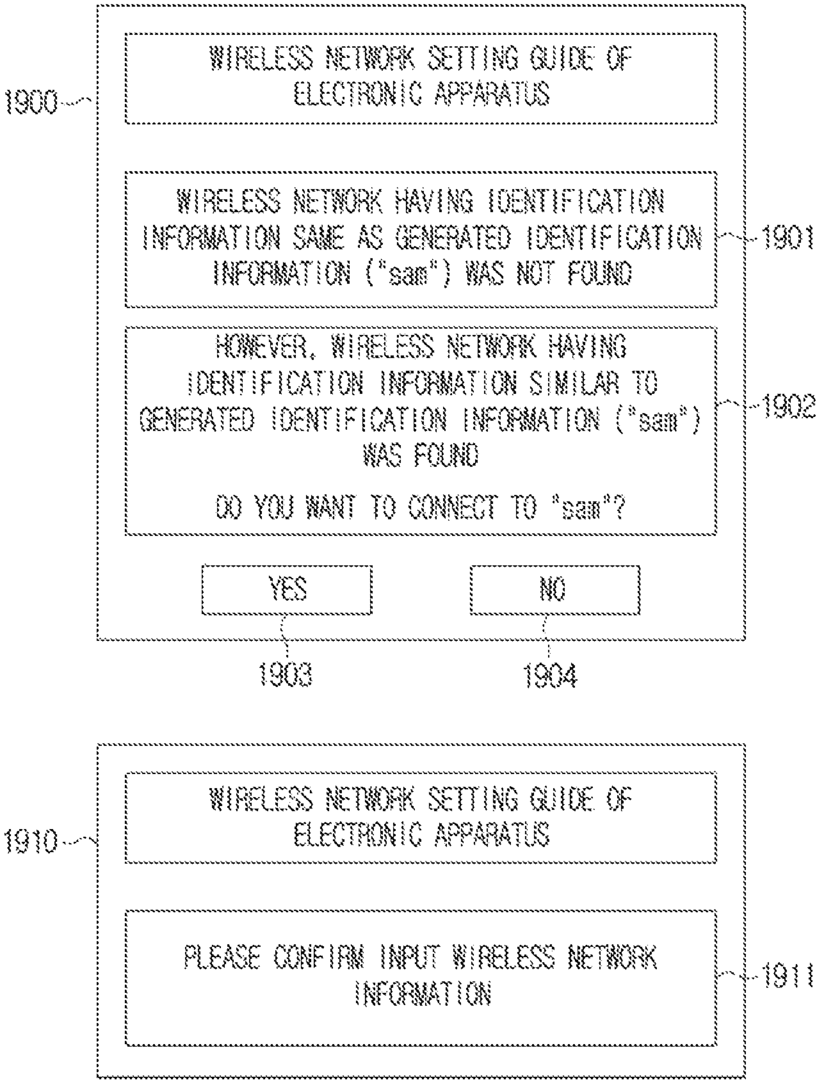
FIG. 19 is a view provided to explain a guide UI for connecting to a wireless network searched using a similarity according to an embodiment.

The example of connecting to a wireless network using a similarity will be illustrated in detail in FIGS. 18 and 19.

Meanwhile, when there are a plurality of wireless networks having a similarity equal to or greater than a threshold value, the processor 120 may output the third guide UI including the identification information of each of the plurality of wireless networks based on the similarity corresponding to each of the plurality of wireless networks.

It is possible to search a plurality of wireless networks that are identical or similar to randomly generated identification information. Accordingly, when a plurality of wireless networks are searched, the processor 120 may generate the third guide UI including the identification information regarding the plurality of wireless networks and output the generated third guide UI. When receiving a user input according to the third guide UI, the processor 120 may connect to one wireless network corresponding to the user input. Here, the user input may be an input specifying a connection target from among the plurality of wireless networks.

Figure 24:
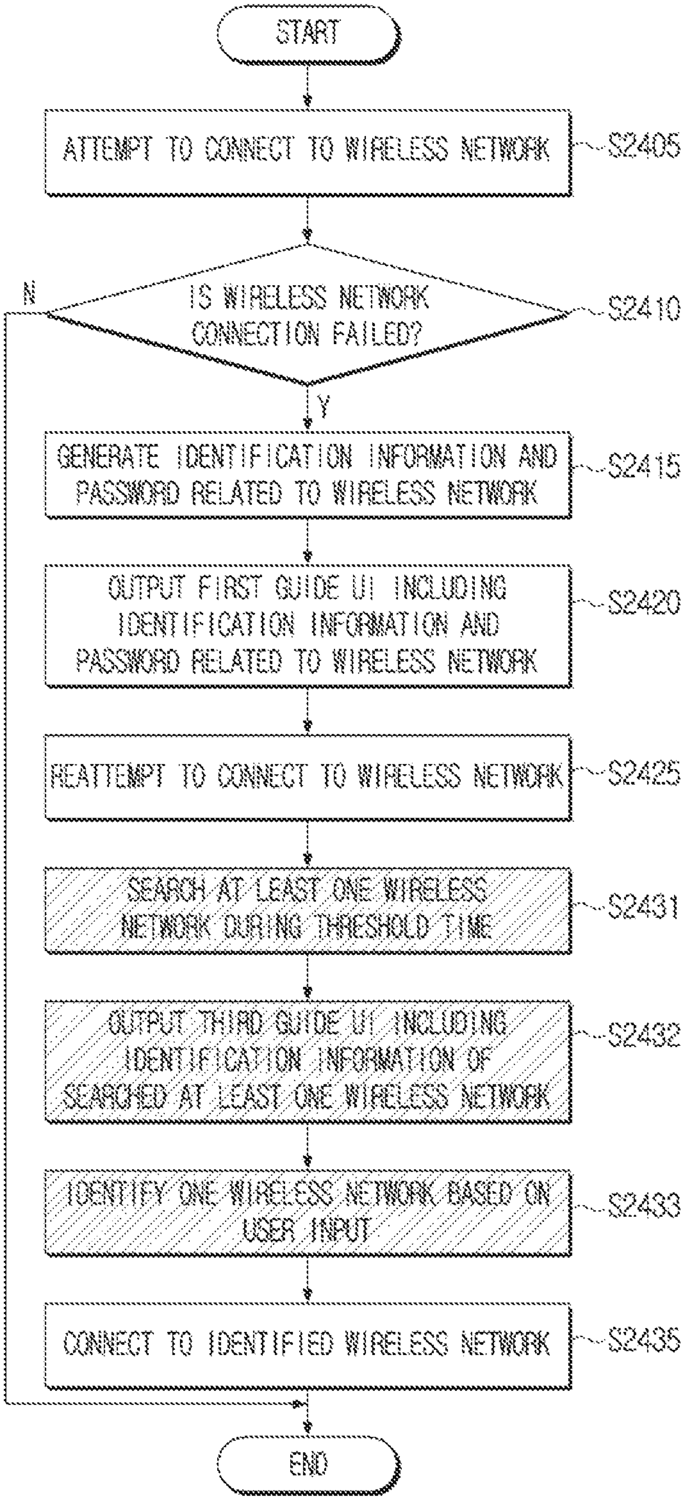
FIG. 24 is a flowchart provided to explain an operation of connecting to a wireless router using a list including a plurality of wireless networks according to an embodiment.
Figure 25:
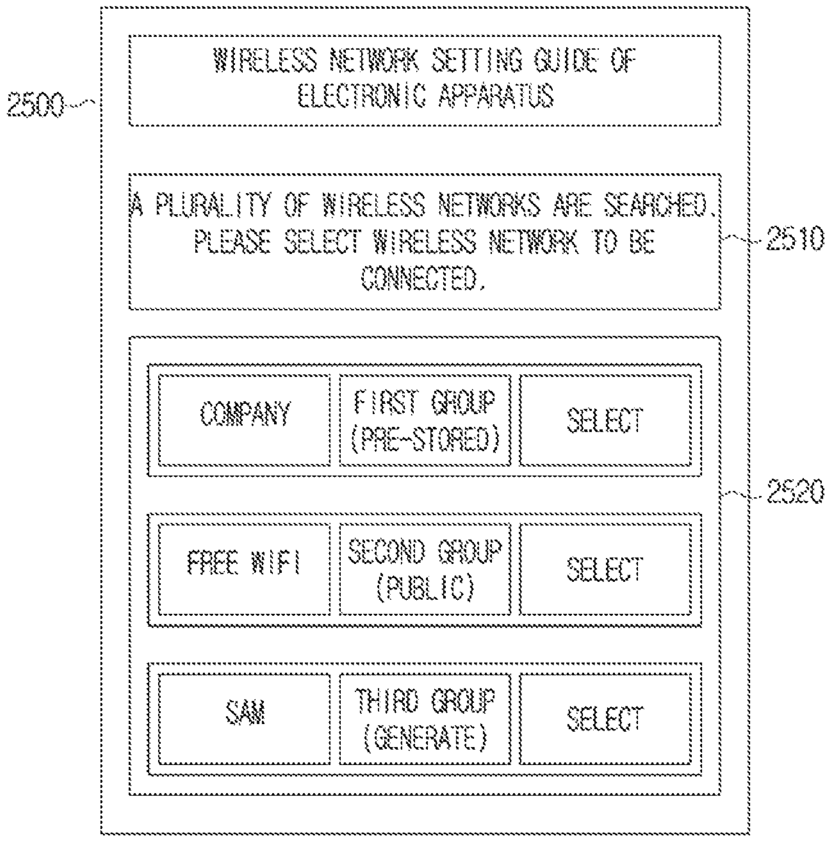
FIG. 25 is a view provided to explain a list including a plurality of wireless networks according to an embodiment.

The situation in which a plurality of wireless networks are searched will be illustrated in detail in FIGS. 24 and 25.

Meanwhile, with respect to the similarity, the similarity between identification information was described, but depending on the embodiment, the electronic apparatus 100 may use a similarity between passwords. Accordingly, the operation regarding the similarity between identification information may be replaced with the similarity between passwords.

Meanwhile, according to various embodiments, the electronic apparatus 100 may connect to a wireless network without manipulating a menu for connecting to the wireless network. The electronic apparatus 100 may connect to a wireless network in a state where only power is supplied without receiving a separate user input. For example, when the electronic apparatus 100 is changed from a state where power is not supplied to a state where power is supplied, the electronic apparatus 100 may randomly generate identification information and a password. In addition, the electronic apparatus 100 may output a guide UI for guiding the user to change the setting information of the wireless network based on the randomly generated identification information and password. The user may complete the change of the setting of the wireless network while watching the provided (or output) guide UI through the wireless router 200 or the external input device 300 that is communicatively connected to the wireless router 200. Here, the user changes the setting information of the wireless network only using the wireless router 200 or the external input device 300 that is communicatively connected to the wireless router 200, and does not manipulate the electronic apparatus separately.

Accordingly, even in a situation where there is no manipulation interface in the electronic apparatus 100, a situation where it is difficult to perform manipulation although there is a manipulation interface, or a situation where it is difficult to make a selection since multiple wireless networks are searched although there is a manipulation interface, the user may easily connect to the intended wireless network.

Meanwhile, the electronic apparatus 100 may be an apparatus in which a physical user input is difficult or impossible. Here, the electronic apparatus 100 may not include a manipulation interface for obtaining a user input. For example, the user may use an external device (the wireless router 200 or the external input device 300) for connecting to a wireless network.

Meanwhile, the electronic apparatus 100 may be an apparatus in which a physical user input is possible. For example, the electronic apparatus 100 may include a manipulation interface for obtaining a user input. The user may transmit a physical force to the electronic apparatus 100 through the manipulation interface. Here, the electronic apparatus 100 may move slightly by the user's physical force, and when the position of the electronic apparatus 100 that has moved slightly is changed, the position of the output image or the guide UI may be also changed. Accordingly, the electronic apparatus 100 including the manipulation interface may also receive a user input using an external device (the wireless router 200 or the external input device 300). For example, in the case of the electronic apparatus 100 including a physical button or a touch sensor, the user may also use an external device (the wireless router 200 or the external input device 300) for connecting the electronic apparatus 100 to a wireless network.

Meanwhile, the operation performed in the electronic apparatus 100 may be performed separately by various devices.

According to an embodiment, the electronic apparatus 100 may perform overall operations by itself. Specifically, the electronic apparatus 100 may perform all of the operations including the operation of randomly obtaining (or generating) identification information and a password, the operation of controlling (or outputting) to generate and provide the first guide UI, the operation of transmitting the first signal (or a communication connection request signal) and a password to the wireless router 200, and the operation of connecting to a wireless network based on a response signal.

According to another embodiment, the electronic apparatus 100 may perform the operation of outputting information and perform the other operations in an external server. Specifically, the external server may perform the operation of randomly obtaining (or generating) identification information and a password, the operation of generating the first guide UI, and the operation of transmitting the generated first guide UI to the electronic apparatus 100. In addition, the processor 120 may perform the operation of controlling (or outputting) to provide the first guide UI received from an external server, the operation of transmitting the first signal (or a communication connection request signal) and a password to the wireless router 200, and the operation of connecting to the wireless network based on a response signal. Here, the subject for performing the described operations may change depending on an embodiment.

Meanwhile, although only a simple configuration constituting the electronic apparatus 100 has been illustrated and described above, various configurations may be additionally provided in implementation, which will be described below with reference to FIG. 2.

Figure 2:
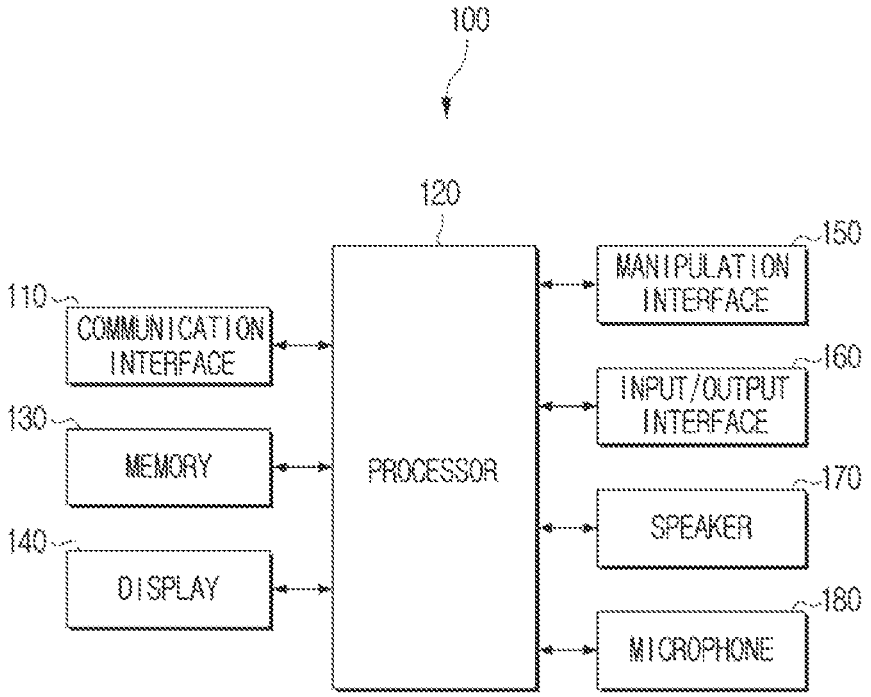
FIG. 2 is a block diagram provided to explain detailed configuration of the electronic apparatus of FIG. 1 according to an embodiment.

FIG. 2 is a block diagram provided to explain detailed configuration of the electronic apparatus 100 of FIG. 1.

Referring to FIG. 2, the electronic apparatus 100 may include the communication interface 110, the processor 120, the memory 130, a display 140, a manipulation interface 150, an input/output interface 160, a speaker 170, and a microphone 180.

Meanwhile, overlapping description regarding the operations same as those described above among the operations of the communication interface 110 and the processor 120 will be omitted.

According to an embodiment, the communication interface 110 may use the same communication module (e.g., a Wi-Fi module) to communicate with an external device such as a remote control device and an external server.

According to another embodiment, the communication interface 110 may use different communication modules to communicate with an external device such as a remote control device and an external server. For example, the communication interface 110 may use at least one of an Ethernet module or a Wi-Fi module to communication with an external server, and may use a Bluetooth module to communicate with an external device such as a remote control device. However, this is only an example, and the communication interface 110 may use at least one communication module from among various communication modules when communicating with a plurality of external devices or external servers.

The memory 130 may be implemented as an internal memory such as a ROM (e.g., electrically erasable programmable read-only memory (EEPROM)) or a RAM included in the processor 120, or implemented as a memory separate from the processor 120. In this case, the memory 130 may be implemented in the form of a memory embedded in the electronic apparatus 100 or in the form of a memory attachable to and detachable from the electronic apparatus 100, depending on the purpose of data storage. For example, data for driving the electronic apparatus 100 may be stored in the memory embedded in the electronic apparatus 100, and data for extended function of the electronic apparatus 100 may be stored in the memory attachable to and detachable from the electronic apparatus 100.

Meanwhile, the memory embedded in the electronic apparatus 100 may be implemented as at least one of a volatile memory (e.g., a dynamic random access memory (DRAM), a static RAM (SRAM), a synchronous dynamic RAM (SDRAM), or the like), or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like), a hard drive, or a solid state drive (SSD)), and the memory attachable to and detachable from the electronic apparatus 100 may be implemented in the form such as a memory card (e.g., a compact flash (CF), a secure digital (SD), a micro secure digital (Micro-SD), a mini secure digital (Mini-SD), an extreme digital (xD), a multi-media card (MMC), or the like), an external memory (e.g., a USB memory) connectable to a USB port, or the like.

The display 140 may be implemented as various types of displays such as a liquid crystal display (LCD), an organic light emitting diodes (OLED) display, a plasma display panel (PDP), and the like. The display 140 may also include a driving circuit, a backlight unit, and the like which may be implemented in the form of an a-si thin film transistor (TFT), a low temperature poly silicon (LTPS) TFT, and an organic TFT (OTFT). Meanwhile, the display 140 may be implemented as a touch screen combined with a touch sensor, a flexible display, a three-dimensional (3D) display, and the like. In addition, according to an embodiment of the disclosure, the display 140 may include a bezel housing a display panel as well as the display panel that outputs an image. In particular, according to an embodiment of the disclosure, the bezel may include a touch sensor (not illustrated) for detecting user interaction.

According to an embodiment, the electronic apparatus 100 may include the display 140. Specifically, the electronic apparatus 100 may directly display the obtained image or content on the display 140.

Meanwhile, according to another embodiment, the electronic apparatus 100 may not include the display 140. The electronic apparatus 100 may be connected to an external display device, and may transmit an image or content stored in the electronic apparatus 100 to the external display device. Specifically, the electronic apparatus 100 may transmit an image or content together with a control signal for controlling to display the image or content on the external display device, to the external display device. Here, the external display device may be connected to the electronic apparatus 100 through the communication interface 110 or the input/output interface 160. For example, the electronic apparatus 100 may not include a display such as a Set Top Box (STB). Also, the electronic apparatus 100 may include only a small display capable of displaying only simple information such as text information. Here, the electronic apparatus 100 may transmit an image or content to the external display device through the communication interface 110 by wire or wirelessly or may transmit it to the external display device through the input/output interface 160.

The manipulation interface 150 may be implemented as a device such as a button, a touch pad, a mouse, or a keyboard, or may also be implemented as a touch screen that may also perform the display function described above and a manipulation/input function. Here, the button may be various types of buttons, such as mechanical buttons, touch pads, wheels, and the like, which are formed in arbitrary areas such as a front portion, a side portion, and a back portion of an exterior of a main body of the electronic apparatus 100.

The input/output interface 160 may be any one interface of a high definition multimedia interface (HDMI), a mobile high-definition link (MHL), a universal serial bus (USB), a display port (DP), a thunderbolt, a video graphics array (VGA) port, an RGB port, a D-subminiature (D-SUB), and a digital visual interface (DVI). The input/output interface 160 may input and output at least one of audio and video signals. According to an implementation example, the input/output interface 160 may include a port for inputting and outputting only the audio signal and a port for inputting and outputting only the video signal as separate ports, or may be implemented as one port for inputting and outputting both the audio signal and the video signal. Meanwhile, the electronic apparatus 100 may transmit at least one of the audio and video signals to an external device (e.g., an external display device or an external speaker) through the input/output interface 160. Specifically, an output port included in the input/output interface 160 may be connected to the external device, and the electronic apparatus 100 may transmit at least one of the audio and video signals to the external device through the output port.

Here, the input/output interface 160 may be connected to a communication interface. The input/output interface 160 may transmit information received from an external device to the communication interface or may transmit information received through the communication interface to the external device.

The speaker 170 may be a component that outputs not only various audio data but also various notification sounds or voice messages.

The electronic apparatus 100 may include the microphone 180.

The microphone 180 is a component for receiving a user voice or other sounds and converting it into audio data. The microphone 180 may receive a user voice in an activated state. For example, the microphone 180 may be integrally formed on an upper side, or in a front direction, a side direction, or the like of the electronic apparatus 100. The microphone 180 may include various components such as a microphone for collecting a user voice in an analog form, an amplifier circuit for amplifying the collected user voice, an A/D conversion circuit for sampling and converting the amplified user voice into a digital signal, a filter circuit for removing noise components from the converted digital signal, and the like.

There may be various embodiments in which the electronic apparatus 100 performs an operation corresponding to a user voice signal received through the microphone 180.

As an example, the electronic apparatus 100 may control the display 140 based on a user voice signal received through the microphone 180. For example, when a user voice signal for displaying content A is received, the electronic apparatus 100 may control the display 140 to display content A.

In another example, the electronic apparatus 100 may control an external display device connected to the electronic apparatus 100 based on a user voice signal received through the microphone 180. Specifically, the electronic apparatus 100 may generate a control signal for controlling the external display device to perform an operation corresponding to the user voice signal in the external display device and transmit the generated control signal to the external display device. Here, the electronic apparatus 100 may store a remote control application for controlling the external display device. Subsequently, the electronic apparatus 100 may transmit the generated control signal to the external display device using at least one communication method of Bluetooth, Wi-Fi or infrared. For example, when a user voice signal for displaying content A is received, the electronic apparatus 100 may transmit a control signal for displaying content A on the external display device to the external display device. Here, the electronic apparatus 100 may mean various terminal devices capable of installing a remote control application, such as a smartphone, an AI speaker, and the like.

In another example, the electronic apparatus 100 may use a remote control device for controlling an external display device connected to the electronic apparatus 100 based on a user voice signal received through the microphone 180. Specifically, the electronic apparatus 100 may transmit a control signal for controlling the external display device to perform an operation corresponding to a user voice signal in the external display device to a remote control device. In addition, the remote control device may transmit the control signal received from the electronic apparatus 100 to the external display device. For example, when receiving a user voice signal for displaying content A, the electronic apparatus 100 may transmit a control signal for controlling to display content A on the external display device to the external display device, and the remote control device may transmit the received control signal to the external display device.

Meanwhile, the electronic apparatus 100 may receive a user voice signal in various ways.

According to an embodiment, the electronic apparatus 100 may receive a user voice signal through the microphone 180 included in the electronic apparatus 100.

According to another embodiment, the electronic apparatus 100 may receive a user voice signal from an external device including a microphone. Here, the external device may mean a remote control device, a smartphone, and the like. Here, the received user voice signal may be a digital voice signal, but depending on an embodiment, it may be an analog voice signal. The electronic apparatus 100 may receive a user voice signal through a wireless communication method such as Bluetooth, Wi-Fi, etc.

Meanwhile, the electronic apparatus 100 may convert a user voice signal in various ways.

According to an embodiment, the electronic apparatus 100 may obtain text information corresponding to a user voice signal from an external server. Specifically, the electronic apparatus 100 may transmit a user voice signal (an audio signal or a digital signal) to an external server. Here, the external server may mean a voice recognition server. Here, the voice recognition server may convert the user voice signal into text information using a Speech To Text (STT) function. In addition, the external server may transmit the text information generated by converting the user voice signal to the electronic apparatus 100.

According to another embodiment, the electronic apparatus 100 may obtain text information corresponding to a user voice signal by itself. Specifically, the electronic apparatus 100 may convert a user voice signal into text information by directly applying a Speech To Text (STT) function to a digital voice signal and transmit the converted text information to an external server.

Meanwhile, an external server may transmit information to the electronic apparatus 100 in various ways.

According to an embodiment, an external server may transmit text information corresponding to a user voice signal to the electronic apparatus 100. Specifically, the external server may be a server that performs a voice recognition function converting a user voice signal into text information.

According to another embodiment, an external server may transmit at least one of text information corresponding to a user voice signal or search result information corresponding to the text information to the electronic apparatus 100. Specifically, the external server may be a server that performs a search result providing function that provides search result information corresponding to text information in addition to a voice recognition function that coverts a user voice signal into text information. For example, the external server may be a server that performs both a voice recognition function and a search result providing function. In another example, the external server may perform only the voice recognition function, and the search result providing function can be performed in a separate server. The external server may transmit text information to a separate server to obtain a search result and obtain a search result corresponding to the text information from the separate server.

Meanwhile, the electronic apparatus 100 may be communicatively connected to an external device and an external server in various ways.

According to an embodiment, a communication module for communication with an external device and an external server may be implemented in the same manner. For example, the electronic apparatus 100 may communicate with an external device using a Bluetooth module, and also communicate with an external server using a Bluetooth module.

According to another embodiment, a communication module for communication with an external device and an external server may be implemented separately. For example, the electronic apparatus 100 may communicate with an external device using a Bluetooth module, and communicate with an external server using an Ethernet model or a Wi-Fi module.

Figure 3:
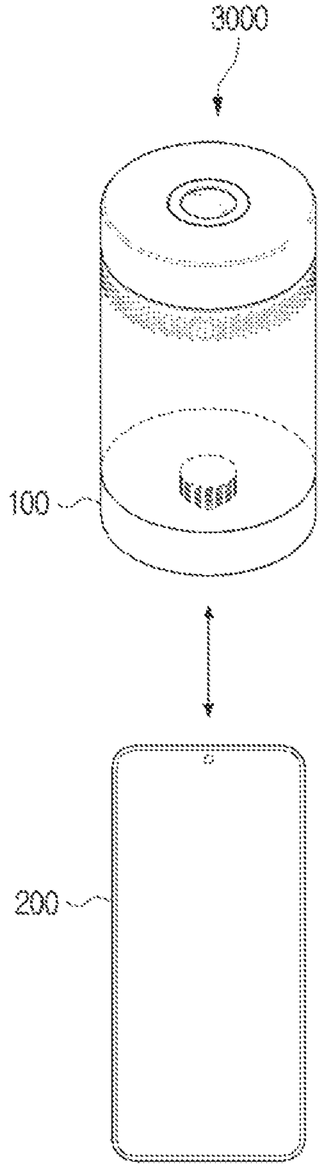
FIG. 3 is a view provided to explain a system for setting a wireless network according to an embodiment.

FIG. 3 is a view provided to explain a system 3000 for setting a wireless network according to an embodiment.

Referring to FIG. 3, the system 3000 may include the electronic apparatus 100 and the wireless router. Here, the electronic apparatus 100 may be implemented as a projector and the wireless router 200 may be implemented as a smartphone. For example, the projector may use a mobile hotspot through the smartphone.

The projector may be connected to a wireless network provided by the smartphone. The projector may randomly generate identification information and a password, and a user may input the generated identification information and password to the smartphone. Subsequently, the user may change the identification information and password provided by the smartphone to the identification information and password generated by the projector. After the setting is changed, the projector may connect to the wireless network provided by the smartphone.

When the electronic apparatus 100 is implemented as a projector, the electronic apparatus 100 may be a projector device that enlarges and projects an image to a wall or a screen, and the projector device may be a digital light processing (DLP)-type projector using an LCD projector or a digital micromirror device (DMD).

In addition, the electronic apparatus 100 may be a home or industrial display device, a lighting device used in daily life, or an acoustic device including an acoustic module, or may be implemented as a portable communication device (e.g., a smartphone), a computer device, a portable multimedia device, a wearable device, a home appliance, or the like. Meanwhile, the electronic apparatus 100 according to an embodiment is not limited to the above devices, and the electronic apparatus 100 may be implemented as the electronic apparatus 100 having two or more functions of the above devices. For example, the electronic apparatus 100 may be configured such that according to the manipulation of the processor, a projector function is turned off and a lighting function or a speaker function is turned on to be used as a display device, a lighting device or an acoustic device, and the electronic apparatus 100 may be used as an AI speaker by including a microphone or a communication device.

Meanwhile, the electronic apparatus 100 may further include a projection unit. The projection unit is configured to project an image to the outside. The projection unit according to an embodiment may be implemented in various projection methods (e.g., cathode-ray tube (CRT) method, Liquid Crystal Display (LCD) method, Digital Light Processing (DLP) method, laser method, etc.).

In addition, the projection unit may include various types of light sources. For example, the projection unit may include at least one light source among a lamp, an LED or a laser. In addition, the projection unit may perform various functions for adjusting an output image under the control of the processor. For example, the projection unit may perform functions such as zoom, keystone, quick corner (4-corner) keystone, lens shift, etc. Specifically, the projection unit may enlarge or reduce an image according to a distance (projection distance) from a screen.

Further, the projection unit may perform a keystone function. In addition, the projection unit may provide a zoom/keystone/focus function by automatically analyzing a surrounding environment and a projection environment without a user input. Further, the projection unit may provide a lighting function using a light source. In addition, the projection unit may provide a user with a dimming function for adjusting the intensity of the light source. Further, the projection unit may provide a dimming function based on content analyzed by the processor without a user input. In addition, the projection unit may control a color temperature under the control of the processor. Further, the electronic apparatus 100 may control the lighting function in association with an external device. In addition, the electronic apparatus 100 may control the lighting function based on biometric information.

Further, a user interface may receive a user input using a non-contact method. When a user input is received through a contact method, a physical force must be transmitted to the electronic apparatus 100. Accordingly, a method for controlling the electronic apparatus 100 irrespective of a physical force may be required. Specifically, the user interface may receive a user gesture, and perform an operation corresponding to the received user gesture. Here, the user interface may receive a user gesture through a sensor (e.g., an image sensor or an infrared sensor).

In addition, the user interface may receive a user input through a touch method. For example, the user interface may receive a user input through a touch sensor. According to an embodiment, the touch method may be implemented as a non-contact method. For example, the touch sensor may determine whether the user body approaches within a threshold distance. Here, the touch sensor may identify a user input even when the user does not contact the touch sensor. Meanwhile, according to another embodiment, the touch sensor may identify a user input in which the user contacts the touch sensor.

Meanwhile, the electronic apparatus 100 may receive a user input in various methods in addition to the above-described user interface. According to an embodiment, the electronic apparatus 100 may receive a user input through an external remote control device. Here, the external remote control device may be a remote control device (e.g., a control device exclusively for an electronic apparatus) corresponding to the electronic apparatus 100 or a user's portable communication device (e.g., a smartphone or a wearable device). Here, the user's portable communication device may store an application for controlling the electronic apparatus. The portable communication device may obtain a user input through the stored application, and transmit the obtained user input to the electronic apparatus 100. The electronic apparatus 100 may receive the user input from the portable communication device and perform an operation corresponding to the user's control command.

Meanwhile, the electronic apparatus 100 may receive a user input using voice recognition. According to an embodiment, the electronic apparatus 100 may receive a user voice through a microphone included in the electronic apparatus. According to another embodiment, the electronic apparatus 100 may receive a user voice from a microphone or an external device. Specifically, the external device may obtain a user voice through a microphone of the external device, and transmit the obtained user voice to the electronic apparatus 100. The user voice transmitted from the external device may be audio data or digital data created by converting audio data (e.g., audio data converted into a frequency domain, etc.). Here, the electronic apparatus 100 may perform an operation corresponding to the received user voice. Specifically, the electronic apparatus 100 may receive audio data corresponding to the user voice through the microphone. Subsequently, the electronic apparatus 100 may convert the received audio data into digital data. The electronic apparatus 100 may transform the converted digital data into text data using a Speech To Text (STT) function. According to an embodiment, the STT function may be performed directly in the electronic apparatus 100.

According to another embodiment, the STT function may be performed in an external server. The electronic apparatus 100 may transmit digital data to the external server. The external server may convert the digital data into text data, and obtain control command data based on the converted text data. The external server may transmit the control command data (here, text data may be included) to the electronic apparatus 100. The electronic apparatus 100 may perform an operation corresponding to the user voice based on the obtained control command data.

Meanwhile, the electronic apparatus 100 may provide a voice recognition function using one assistant (or an artificial intelligence assistant such as Bixby™, etc.), but this is only an example. The electronic apparatus 100 may provide a voice recognition function through a plurality of assistants. In this case, the electronic apparatus 100 may provide a voice recognition function by selecting one of the plurality of assistants based on a trigger word corresponding to the assistant or a specific key existing in a remote controller.

Meanwhile, the electronic apparatus 100 may receive a user input using a screen interaction. The screen interaction may mean the function of identifying whether a predetermined event occurs through an image projected by the electronic apparatus on a screen (or a projection surface) and obtaining a user input based on the predetermined event. Here, the predetermined event may refer to an event in which a predetermined object is identified at a specific location (e.g., a location on which a UI for receiving a user input is projected). Here, the predetermined object may include at least one of a user's body part (e.g., a finger), a pointing rod or a laser point. When the predetermined object exists (or is identified) at a location corresponding to the projected UI, the electronic apparatus 100 may identify that a user input of selecting the projected UI is received. For example, the electronic apparatus 100 may project a guide image to display a UI on the screen. The electronic apparatus 100 may identify whether a user selects the projected UI. Specifically, when the predetermined event is identified at the location of the projected UI, the electronic apparatus may identify that the user has selected the projected UI. Here, the projected UI may include one or more items. Here, the electronic apparatus 100 may perform a space analysis to identify whether the predetermined event occurs at the location of the projected UI. Here, the electronic apparatus 100 may perform a space analysis through a sensor (e.g., an image sensor, an infrared sensor, a depth camera, a distance sensor, etc.). By performing a space analysis, the electronic apparatus 100 may identify whether the predetermined event occurs at a specific location (the location where the UI is projected). When it is identified that the predetermined event occurs at the specific location (the location where the UI is projected), the electronic apparatus 100 may identify that a user input for selecting a UI corresponding to the specific location is received.

Figure 4:
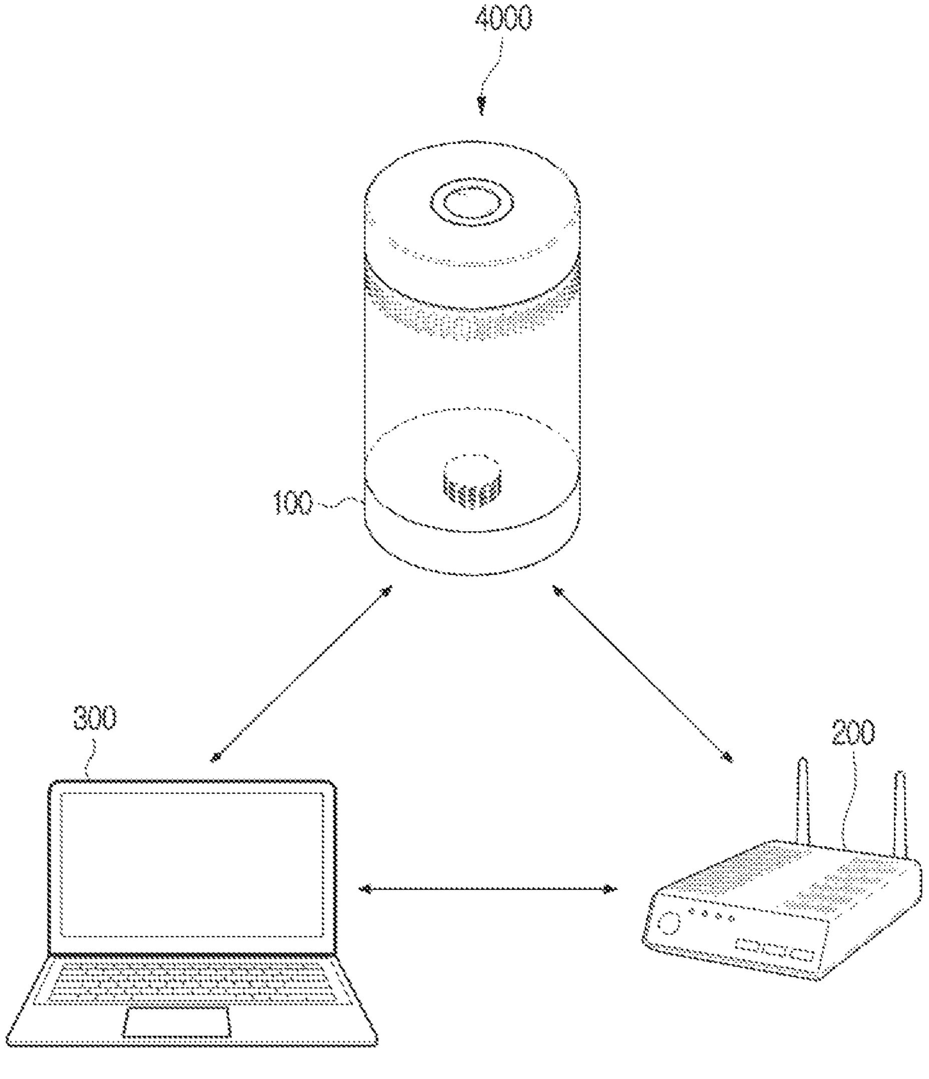
FIG. 4 is a view provided to explain a system for setting a wireless network according to another embodiment.

FIG. 4 is a view provided to explain a system 4000 for setting a wireless network according to another embodiment.

Referring to FIG. 4, the system 4000 may include the electronic apparatus 100, the wireless router 200 and the external input device 300. Here, the electronic apparatus 100 may be implemented as a projector, the wireless router 200 may be implemented as an Internet router, and the external input device 300 may be implemented as a PC (a desktop PC or a notebook PC). For example, the projector may use the external input device 300 to set a wireless network provided by the Internet router.

The projector may be connected to the wireless network provided by the Internet router. The projector may randomly generate identification information and a password, and a user may change the setting of the Internet router through the PC based on the identification information and password generated by the projector. Subsequently, the user may change the identification information and password of the wireless network provided by the Internet router through the PC to the identification information and password generated by the projector. After the setting is changed, the projector may be connected to the wireless network provided by the Internet router.

Figure 5:
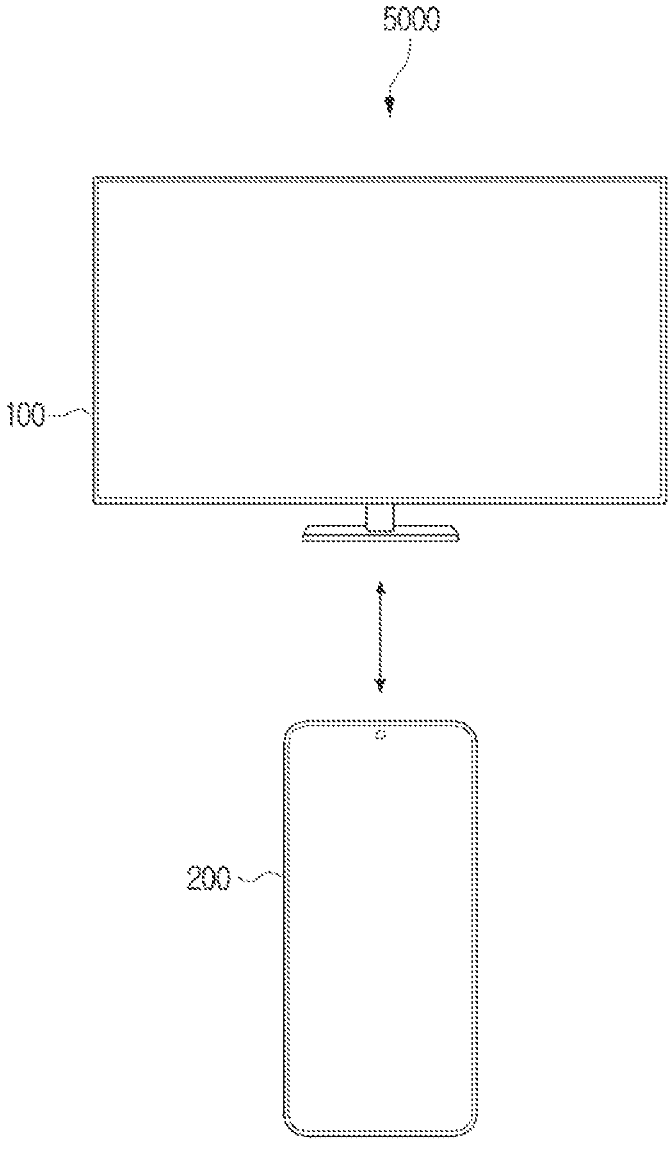
FIG. 5 is a view provided to explain a system for setting a wireless network according to another embodiment.

FIG. 5 is a view provided to explain a system 5000 for setting a wireless network according to another embodiment.

Referring to FIG. 5, the system 5000 may include the electronic apparatus 100 and the wireless router 200. Here, the electronic apparatus 100 may be implemented as a TV, and the wireless router 200 may be implemented as a smartphone. For example, the TV may use a mobile hotspot through the smartphone.

The TV may be connected to a wireless network provided by the smartphone. The TV may randomly generate identification information and a password, and a user may input the generated identification information and password to the smartphone. Subsequently, the user may change the identification information and password of the wireless network provided by the smartphone to the identification information and password generated by the TV. After the setting is changed, the TV may be connected to the wireless network provided by the smartphone.

Figure 6:
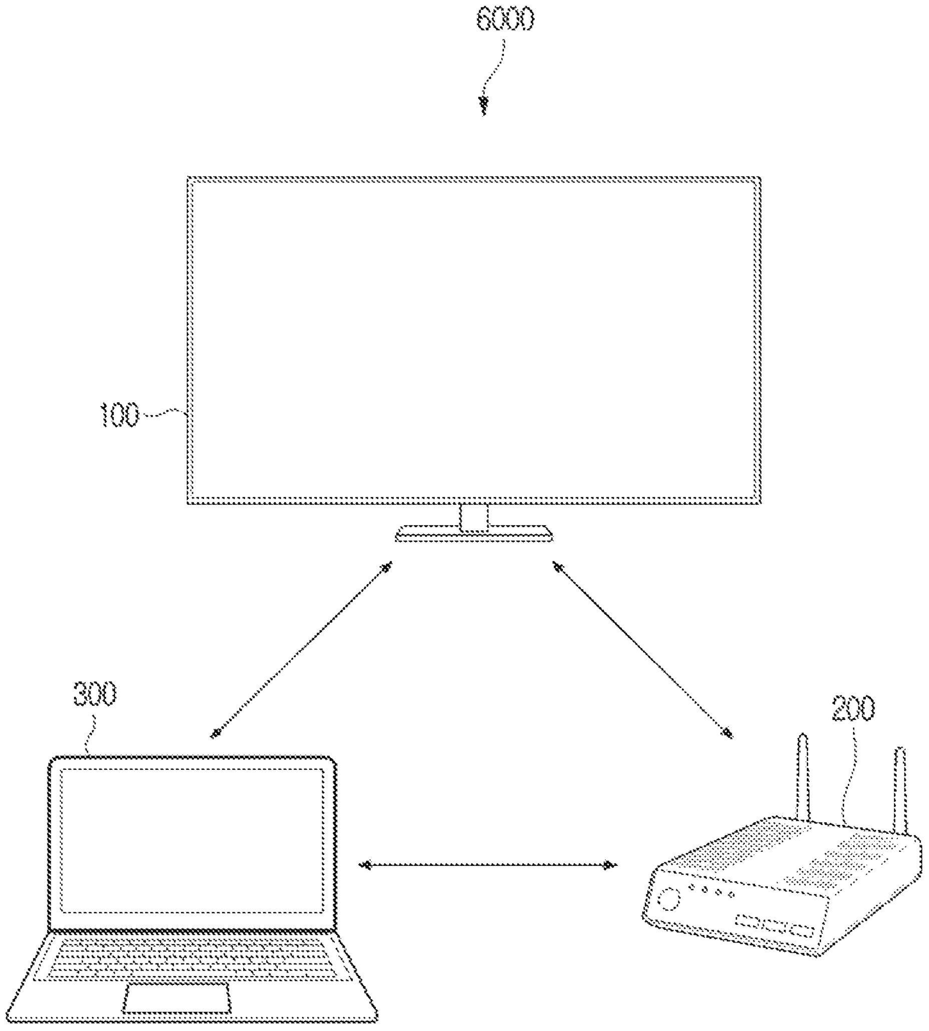
FIG. 6 is a view provided to explain a system for setting a wireless network according to another embodiment.

FIG. 6 is a view provided to explain a system 6000 for setting a wireless network according to another embodiment.

Referring to FIG. 6, the system 6000 may include the electronic apparatus 100, the wireless router 200 and the external input device 300. Here, the electronic apparatus 100 may be implemented as a TV, the wireless router 200 may be implemented as an Internet router, and the external input device 300 may be implemented as a PC (a desktop PC or a notebook PC). For example, the TV may use the external input device 300 to set a wireless network provided by the Internet router.

The TV may be connected to the wireless network provided by the Internet router. The TV may randomly generate identification information and a password, and a user may change the setting of the Internet router through the PC based on the identification information and password generated by the TV. Subsequently, the user may change the identification information and password provided by the Internet router through the PC to the identification information and password generated by the TV. After the setting is changed, the TV may be connected to the wireless network provided by the Internet router.

Figure 7:
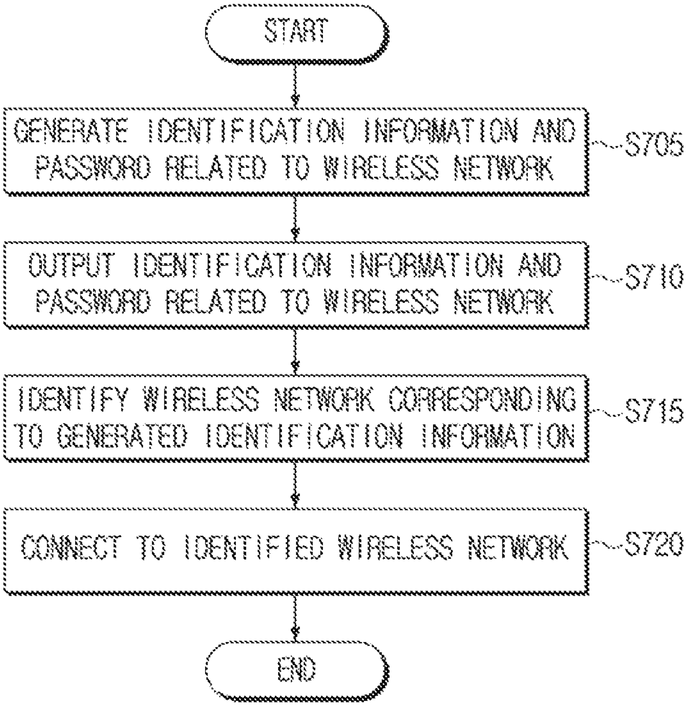
FIG. 7 is a flowchart provided to explain an operation of an electronic apparatus connected to a wireless router according to an embodiment.

FIG. 7 is a flowchart provided to explain an operation of the electronic apparatus 100 connected to the wireless router 200.

Referring to FIG. 7, the electronic apparatus 100 may generate identification information and a password related to a wireless network (S705). Here, the electronic apparatus 100 may randomly obtain identification information and a password of the wireless network.

The electronic apparatus 100 may output the identification information and password related to the wireless network (S710). Here, the electronic apparatus 100 may output the generated (or obtained) identification information and password as an image or audio.

The electronic apparatus 100 may identify a wireless network corresponding to the generated identification information (S715). Here, the electronic apparatus 100 may search a wireless network having identification information same as the generated identification information.

The electronic apparatus 100 may be connected to the identified wireless network (S720). Here, the electronic apparatus 100 may be connected to a wireless router that provides the identified wireless network.

FIG. 8 is a view provided to explain a guide UI output by the electronic apparatus 100 according to an embodiment.

Referring to FIG. 8, the electronic apparatus 100 may output the guide UI 800. Here, the guide UI 800 may include at least one of a UI 801 requesting to set identification information and a password of a wireless network to be connected or a UI 802 including identification information and a password of a wireless network. The user may recognize that the setting information of the wireless network needs to be changed while viewing the guide UI 800 that is controlled (or output) to be provided by the electronic apparatus 100.

Here, the UI 800 may mean the first guide UI.

Meanwhile, the electronic apparatus 100 may output the guide UI 810. Here, the guide UI 810 may further include a UI 811 including information that the password does not match in addition to the UI 801 requesting to set identification information and a password of a wireless network to be connected and the UI 802 including identification information and a password of a wireless network.

Here, the UI 810 may mean the second guide UI.

Figure 9:
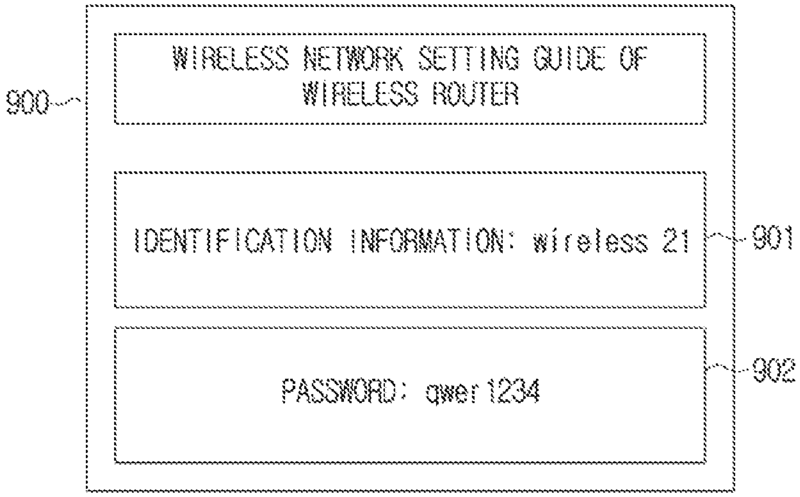
FIG. 9 is a view provided to explain a guide UI output by a wireless router according to an embodiment.

FIG. 9 is a view provided to explain a guide UI output by the wireless router 200 according to an embodiment.

Referring to FIG. 9, the wireless router 200 may output a guide UI 900. Here, the guide UI 900 may include setting information of the wireless network currently provided by the wireless router 200. Here, the setting information may include identification information and a password. Specifically, the guide UI 900 may include at least one of a UI 901 including identification information of the wireless network provided by the wireless router 200 or a UI 902 including a password of the wireless network provided by the wireless router 200.

The UIs 901, 902 in FIG. 9 may mean currently set identification information and password, not the identification information and password generated by the electronic apparatus 100.

Here, the guide UI 900 may mean the fourth guide UI.

Figure 10:
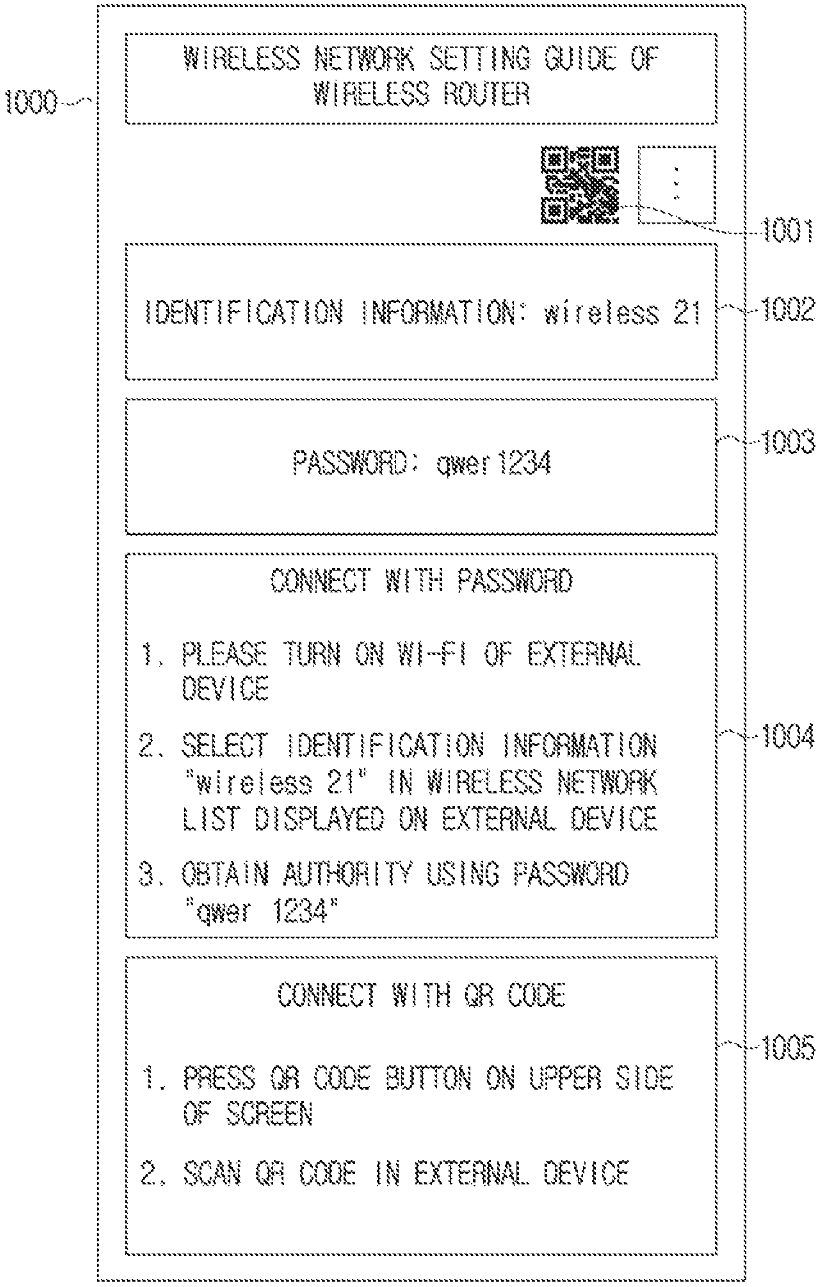
FIG. 10 is a view provided to explain a guide UI output by a wireless router according to another embodiment.

FIG. 10 is a view provided to explain a guide UI output by the wireless router 200 according to another embodiment.

Referring to FIG. 10, the wireless router 200 may output a guide UI 1000. Here, the guide UI 1000 may include at least one of setting information of the wireless network provided by the wireless router 200 or wireless network connection guide information. Here, the setting information may include identification information and a password. Here, the wireless network connection guide information may be information indicating a manipulation method of an external device (e.g., the electronic apparatus 100) in order to connect to the wireless network. Specifically, the guide UI 1000 may include at least one of a UI 1001 for generating a QR code including information related to the wireless network, a UI 1002 including identification information of the wireless network, a UI 1003 including a password of the wireless network, a UI 1004 including a method of connecting to the wireless network through the password, or a UI 1005 including a method of connecting to the wireless network through the QR code.

Here, the guide UI 1000 may mean the fourth guide UI.

Figure 11:
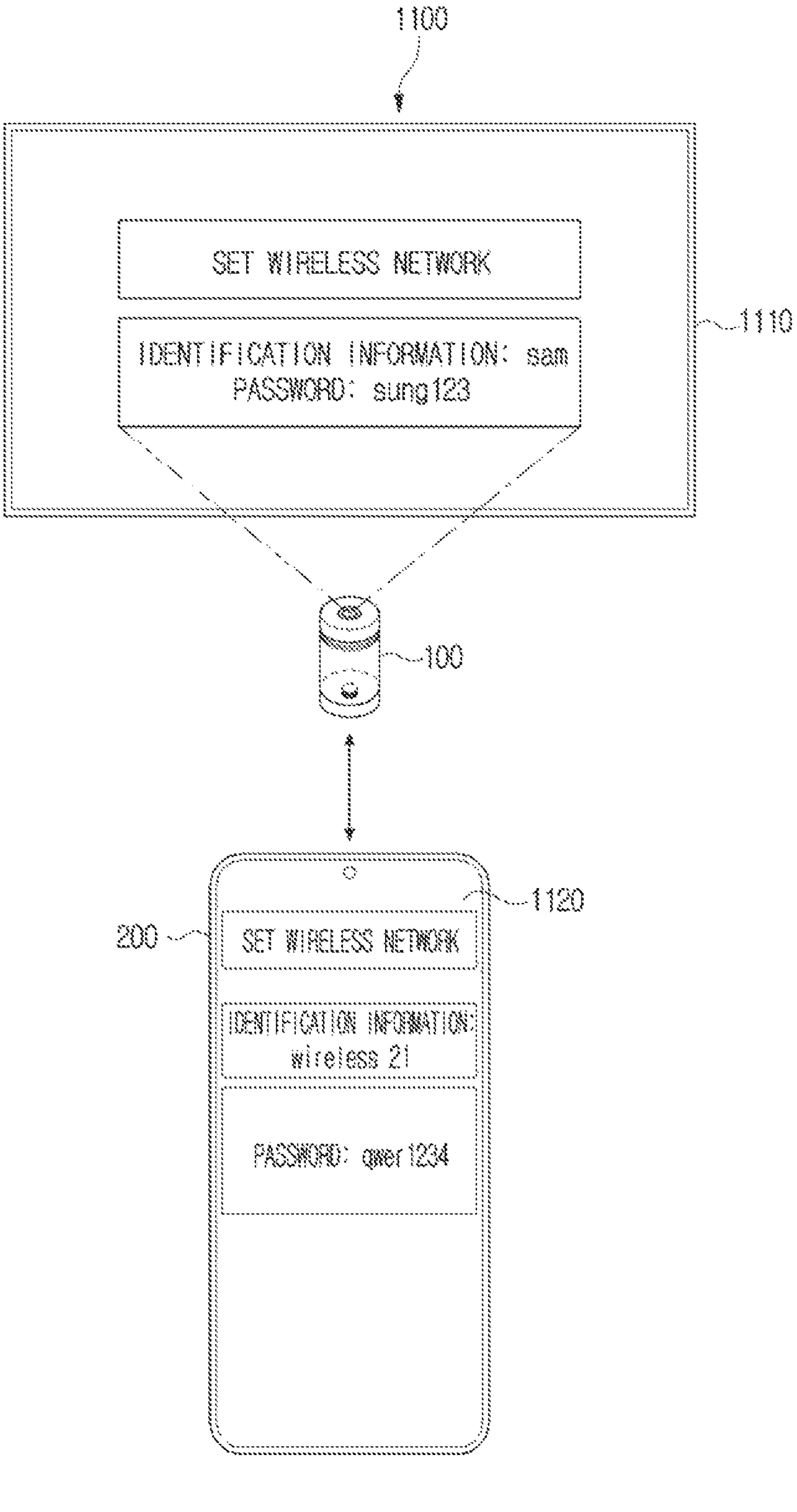
FIG. 11 is a view provided to explain a guide UI output to an electronic apparatus and a wireless router according to an embodiment.

FIG. 11 is a view provided to explain a guide UI output to the electronic apparatus 100 and the wireless router 200 according to an embodiment.

Referring to FIG. 11, a system 1100 may include the electronic apparatus 100 and the wireless router 200. Here, the electronic apparatus 100 may be implemented as a projector and the wireless router 200 may be implemented as a smartphone.

Here, the projector may output a guide UI 1110 to a projection surface. Here, the guide UI 1110 may include identification information and a password related to a wireless network randomly generated by the projector.

Here, the smartphone may output a guide UI 1120 on the display. Here, the guide UI 1120 may include identification information and a password of a wireless network that is currently set in the smartphone.

Here, the user may change the setting information of the wireless network set in the smartphone to the setting information provided (or output) by the projector. For example, the user may change the identification information and password of the wireless network provided by the smartphone to the identification information and password output by the projector.

Figure 12:
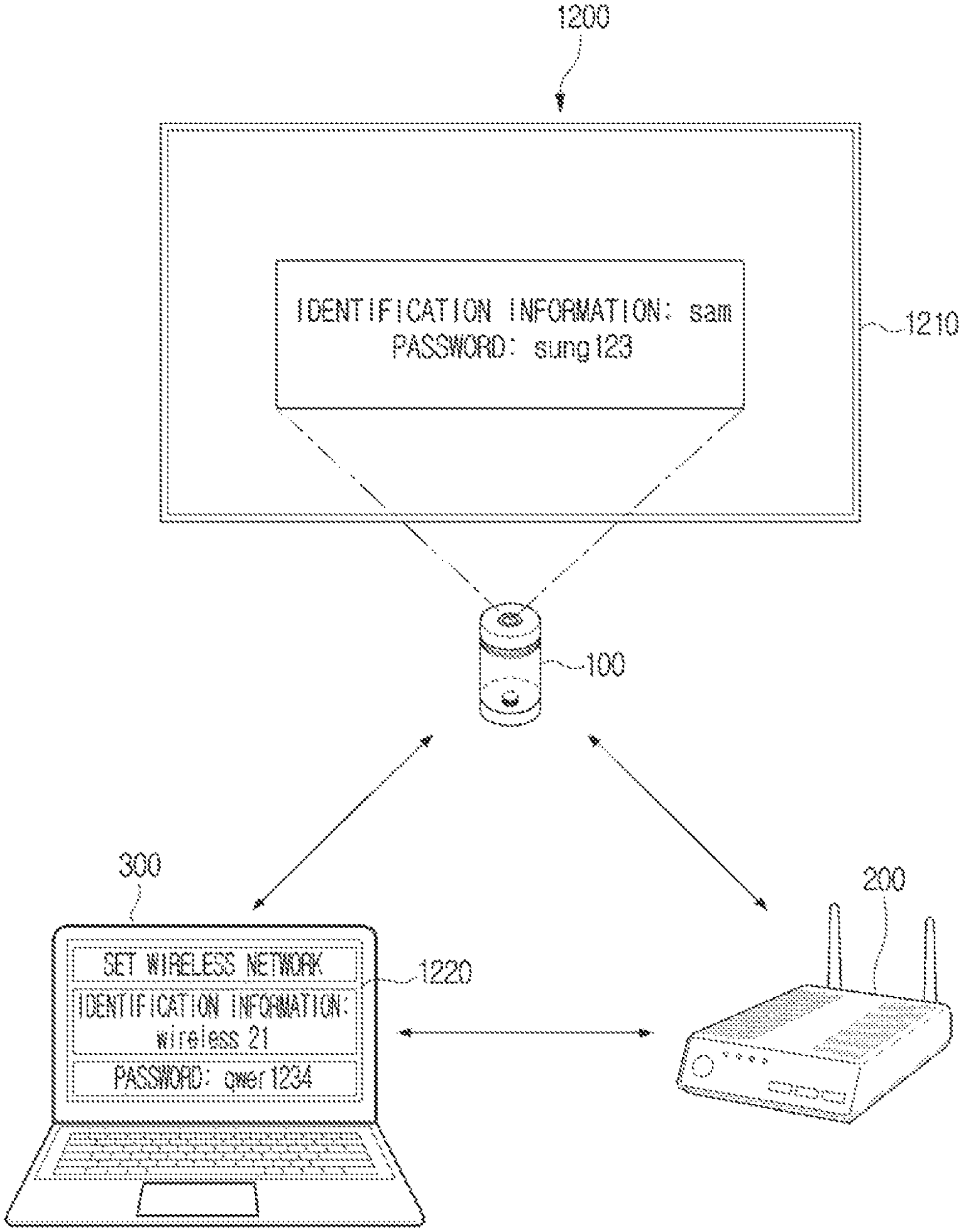
FIG. 12 is a view provided to explain a guide UI output to an electronic apparatus and a wireless router according to another embodiment.

FIG. 12 is a view provided to explain a guide UI output to the electronic apparatus 100 and the wireless router 200 according to another embodiment.

Referring to FIG. 12, a system 1200 may include the electronic apparatus 100, the wireless router 200 and the external input device 300. Here, the electronic apparatus 100 may be implemented as a projector, the wireless router 200 may be implemented as an Internet router, and the external input device 300 may be implemented as a PC (a desktop PC or a notebook PC).

Here, the projector may output a guide UI 1210 to a projection surface. Here, the guide UI 1210 may include identification information and a password related to a wireless network randomly generated by the projector.

Here, the Internet router may receive new identification information and password from the PC.

Here, the PC may output a guide UI 1220 on the display. Here, the guide UI 1220 may include identification information and a password of a wireless network that is currently set in the Internet router.

Here, the user may change the setting information of the wireless network set in the Internet router to the setting information provided (or output) by the projector through the PC. For example, the user may change the identification information and password of the wireless network provided by the Internet router to the identification information and password output by the projector through the PC. The PC may transmit the identification information and password input by the user to the Internet router.

Figure 13:
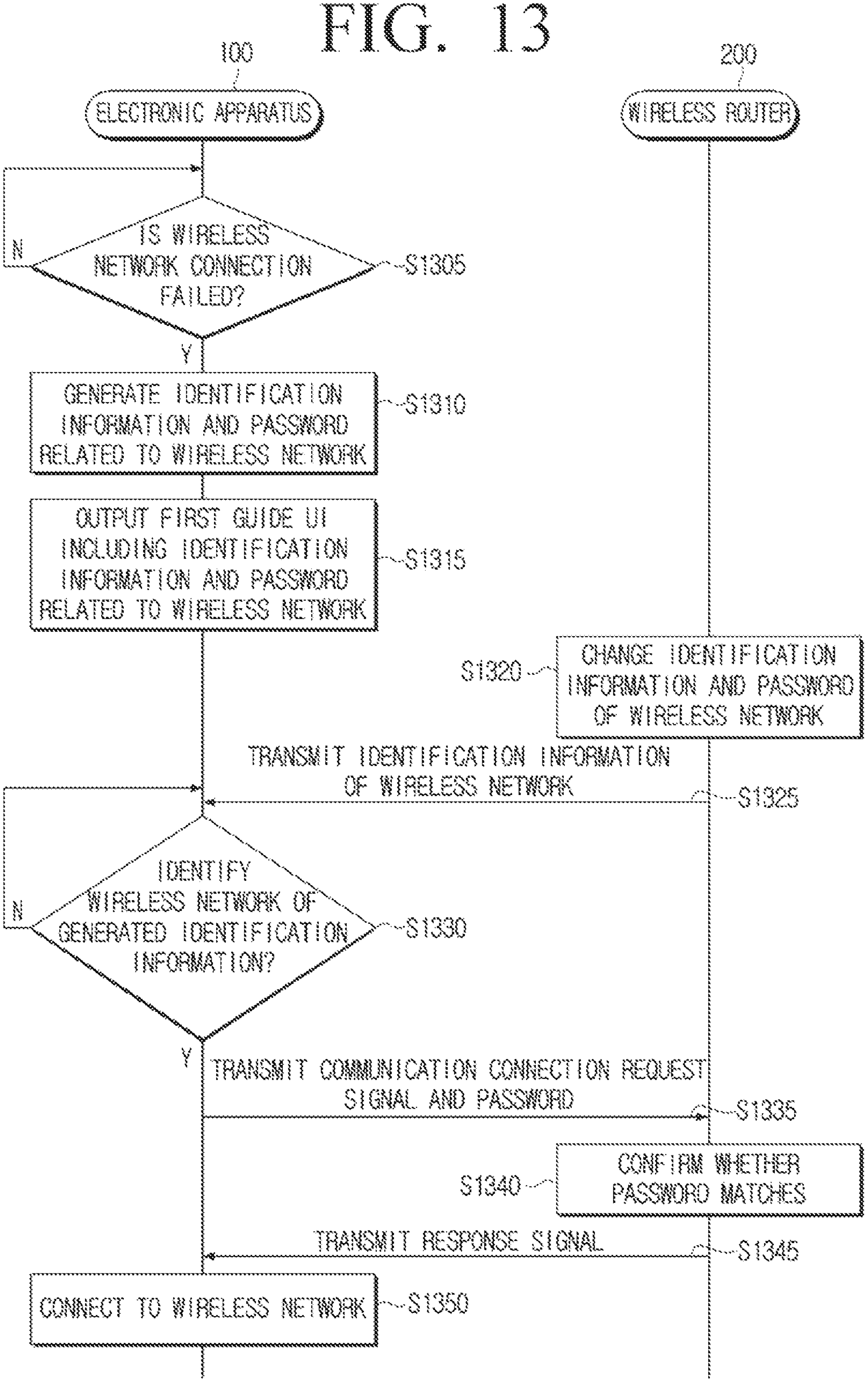
FIG. 13 is a flowchart provided to explain an operation of generating identification information and a password related to a wireless network and connecting to a wireless router according to an embodiment.

FIG. 13 is a flowchart provided to explain an operation of generating identification information and a password related to a wireless network and connecting to the wireless router 200 according to an embodiment.

Referring to FIG. 13, the electronic apparatus 100 may identify whether wireless network connection has failed (S1305). If the wireless network connection has not failed (S1305—N), the electronic apparatus 100 may be communicatively connected to the wireless network.

When the wireless network connection has failed (S1305—Y), the electronic apparatus 100 may generate identification information and a password related to the wireless network (S1310). Subsequently, the electronic apparatus 100 may output the first guide UI including the identification information and password related to the wireless network (S1315). Here, the description regarding the first guide UI is illustrated in detail in the guide UI 800 of FIG. 8.

Meanwhile, after the identification information and password related to the wireless network is provided (or output) by the electronic apparatus 100, the wireless router 200 may change the identification information and password of the wireless network (S1320). Specifically, the wireless router 200 may change the setting of the wireless network based on newly input identification information and password. Subsequently, the wireless router 200 may transmit the (changed) identification information of the wireless network to the electronic apparatus 100 (S1325).

Here, the electronic apparatus 100 may store the identification information received from the wireless router 200. The electronic apparatus 100 may identify the wireless network of the generated identification information (S1330). If the wireless network of the generated identification information does not exist (or it is not identified) (S1330—N), the electronic apparatus 100 may identify or search the wireless network of the generated identification information repeatedly.

Here, if the wireless network of the generated identification information is identified (or it exists) (S1330—Y), the electronic apparatus 100 may transmit a communication connection request signal and a password to the wireless router 200 (S1335).

Here, the wireless router 200 may confirm whether the password received from the electronic apparatus 100 matches the set password (S1340). Subsequently, the wireless router 200 may transmit a response signal (S1345). Here, the response signal may include result information on whether or not the password matches.

Here, the electronic apparatus 100 may be connected to the wireless network based on the response signal received from the wireless router (S1350).

Figure 14:
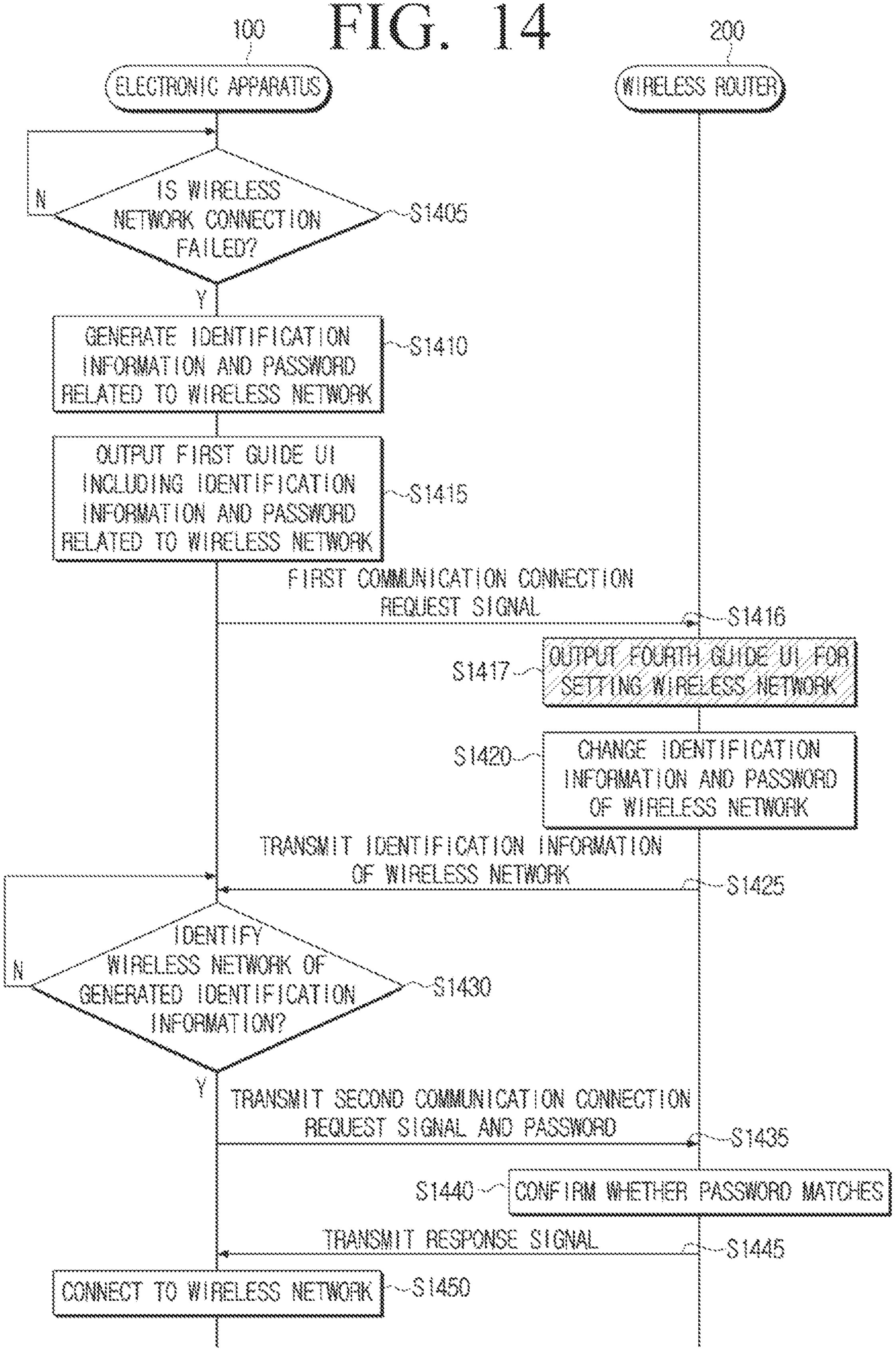
FIG. 14 is a flowchart provided to explain an operation of generating identification information and a password related to a wireless network and connecting to a wireless router according to another embodiment.

FIG. 14 is a flowchart provided to explain an operation of generating identification information and a password related to a wireless network and connecting to the wireless router 200 according to another embodiment.

Referring to FIGS. 14, S1405, S1410, S1415, S1420, S1425, S1430, S1435, S1440, S1445, and S1450 correspond to S1305, S1310, S1315, S1320, S1325, S1330, S1335, S1340, S1345, and S1350 of FIG. 13 and thus, the overlapping description will be omitted.

Here, after the step of S1415 is performed, the electronic apparatus 100 may transmit a first communication connection request signal to the wireless router 200 (S1416). Here, the first communication connection request signal may include a signal that controls the wireless router 200 to output a guide UI.

Here, when receiving the first communication connection request signal from the electronic apparatus 100, the wireless router 200 may output the fourth guide UI for setting a wireless network (S1417). After outputting the fourth guide UI, the wireless router 200 may obtain identification information and a password related to the wireless network (S1420). The fourth guide UI is illustrated in detail in FIGS. 9 and 10.

Figure 15:
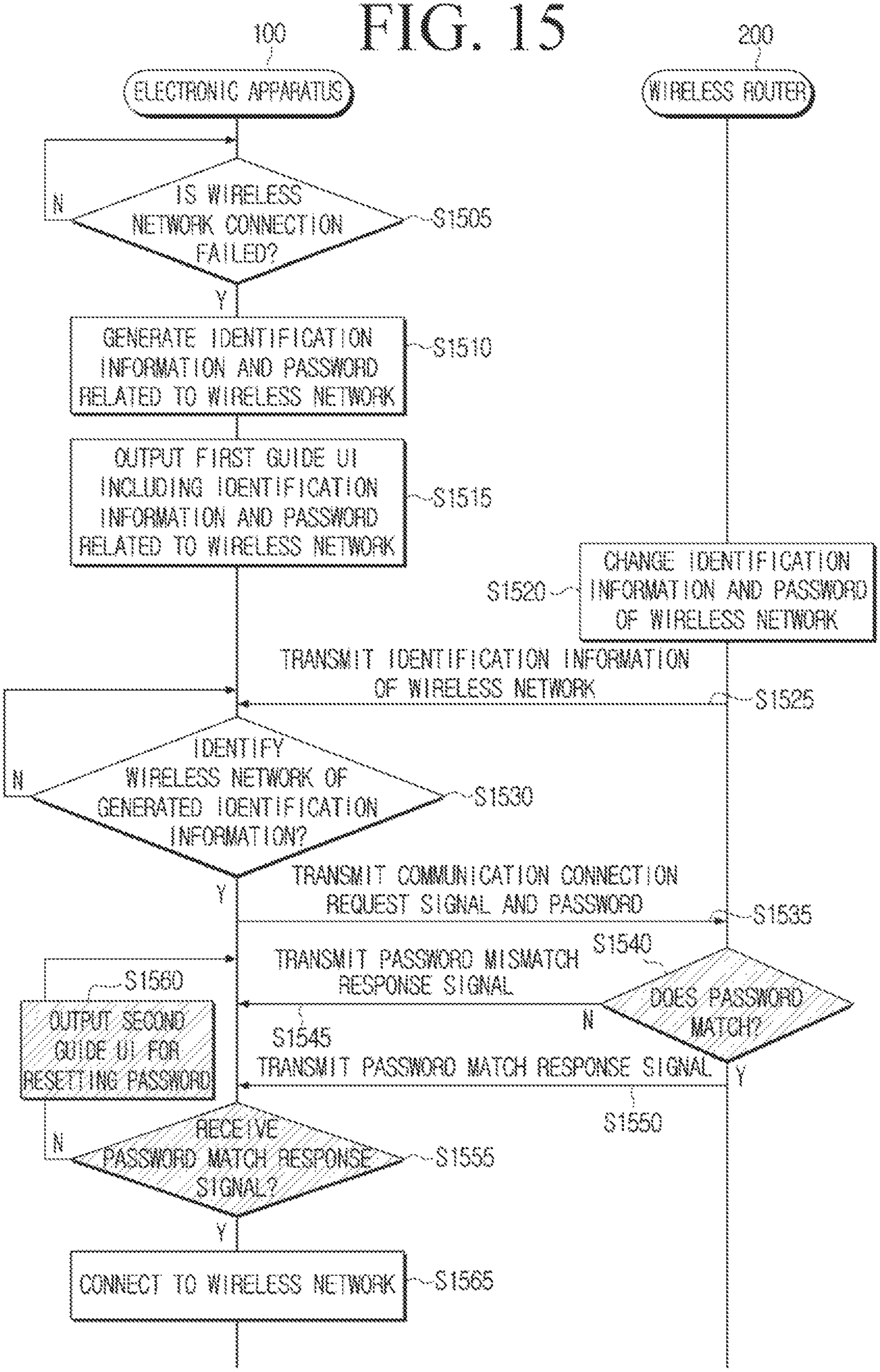
FIG. 15 is a flowchart provided to explain an operation of controlling to provide a guide UI for resetting a password according to an embodiment.

FIG. 15 is a flowchart provided to explain an operation of controlling to provide a guide UI for resetting a password.

Referring to FIGS. 15, S1505, S1510, S1515, S1520, S1525, S1530, and S1535 correspond to S1305, S1310, S1315, S1320, S1325, S1330, and S1335 of FIG. 13 and thus, the overlapping description will be omitted.

Here, when receiving the communication connection request signal and password in the step of S1535, the wireless router 200 may identify whether the password matches (S1540). Specifically, the wireless router 200 may identify whether the password obtained in the step of S1520 matches the password obtained (from the electronic apparatus 100) in the step of S1535.

If the password input to the wireless router 200 does not match the password received from the electronic apparatus 100 (S1540—N), the wireless router 200 may transmit a password mismatch response signal to the electronic apparatus 100 (S1545).

If the password input to the wireless router 200 does not match the password received from the electronic apparatus 100 (S1540—Y), the wireless router 200 may transmit a password match response signal to the electronic apparatus (S1550).

Here, the electronic apparatus 100 may identify whether the password match response signal is received (S1555). If the password match response signal is not received (S1555—N), the second guide UI for resetting a password may be output. The electronic apparatus 100 may identify whether the password match response signal is received repeatedly. Here, the second guide UI is illustrated in detail in the guide UI 810 of FIG. 8.

Here, when the password match response signal is received (S1555—Y), the electronic apparatus 100 may be connected to the wireless network (S1565).

Figure 16:
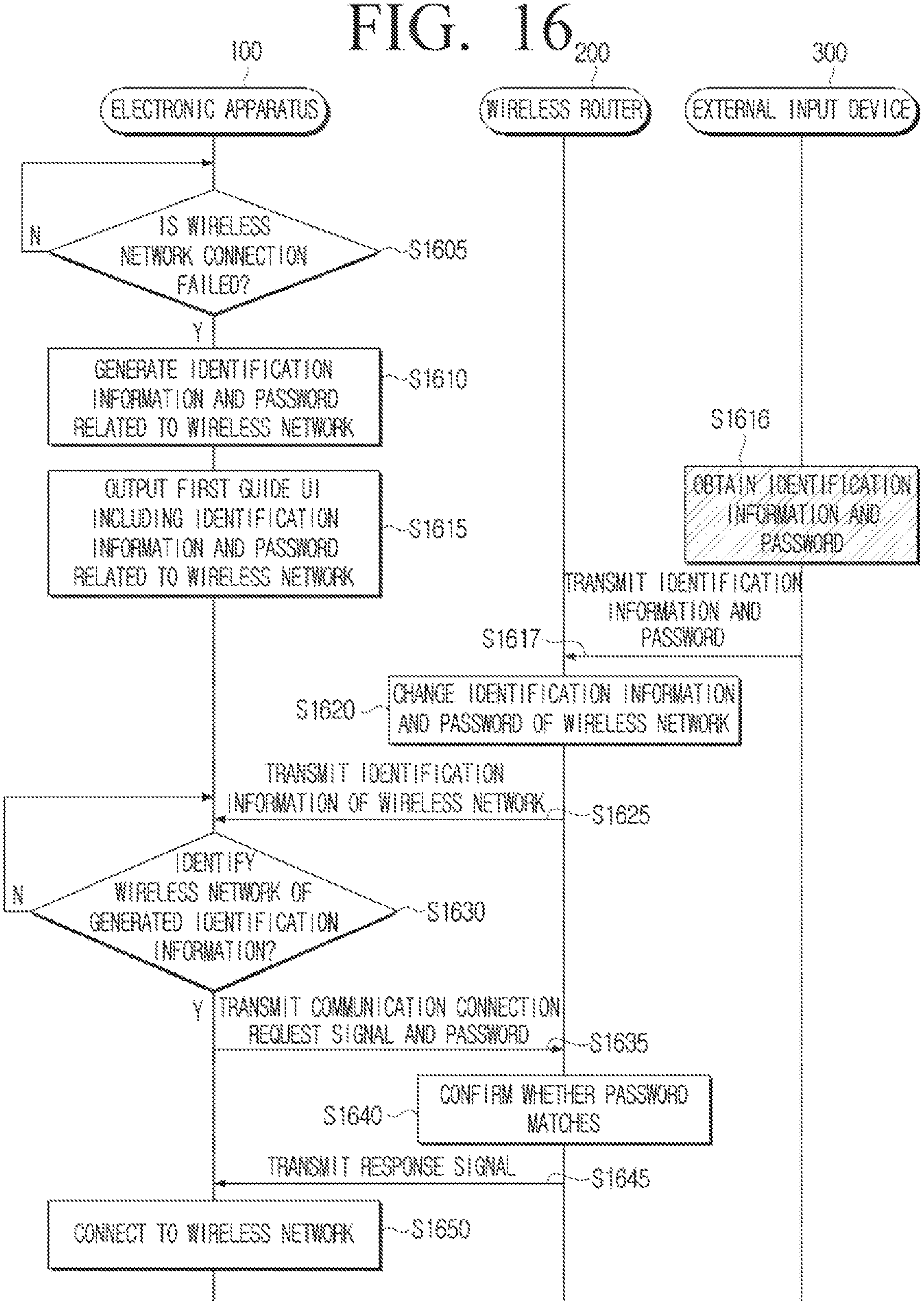
FIG. 16 is a flowchart provided to explain an operation of changing identification information and a password of a wireless network through an external input device according to an embodiment.

FIG. 16 is a flowchart provided to explain an operation of changing identification information and a password of a wireless network through the external input device 300.

Referring to FIGS. 16, S1605, S1610, S1615, S1620, S1625, S1630, S1635, S1640, S1645, and S1650 may correspond to S1305, S1310, S1315, S1320, S1325, S1330, S1335, S1340, S1345, and S1350 of FIG. 13 and thus, the overlapping description will be omitted.

Here, the wireless router 200 may obtain identification information and a password of a wireless network from the external input device 300. Specifically, the external input device 300 may obtain identification information and a password of a wireless network (S1616). Subsequently, the external input device 300 may transmit the obtained identification information and password to the wireless router 200 (S1617).

When receiving the identification information and password from the external input device 300, the wireless router 200 may change the identification information and password of the wireless network based on the identification information and password received from the wireless router 200 (S1620).

Figure 17:
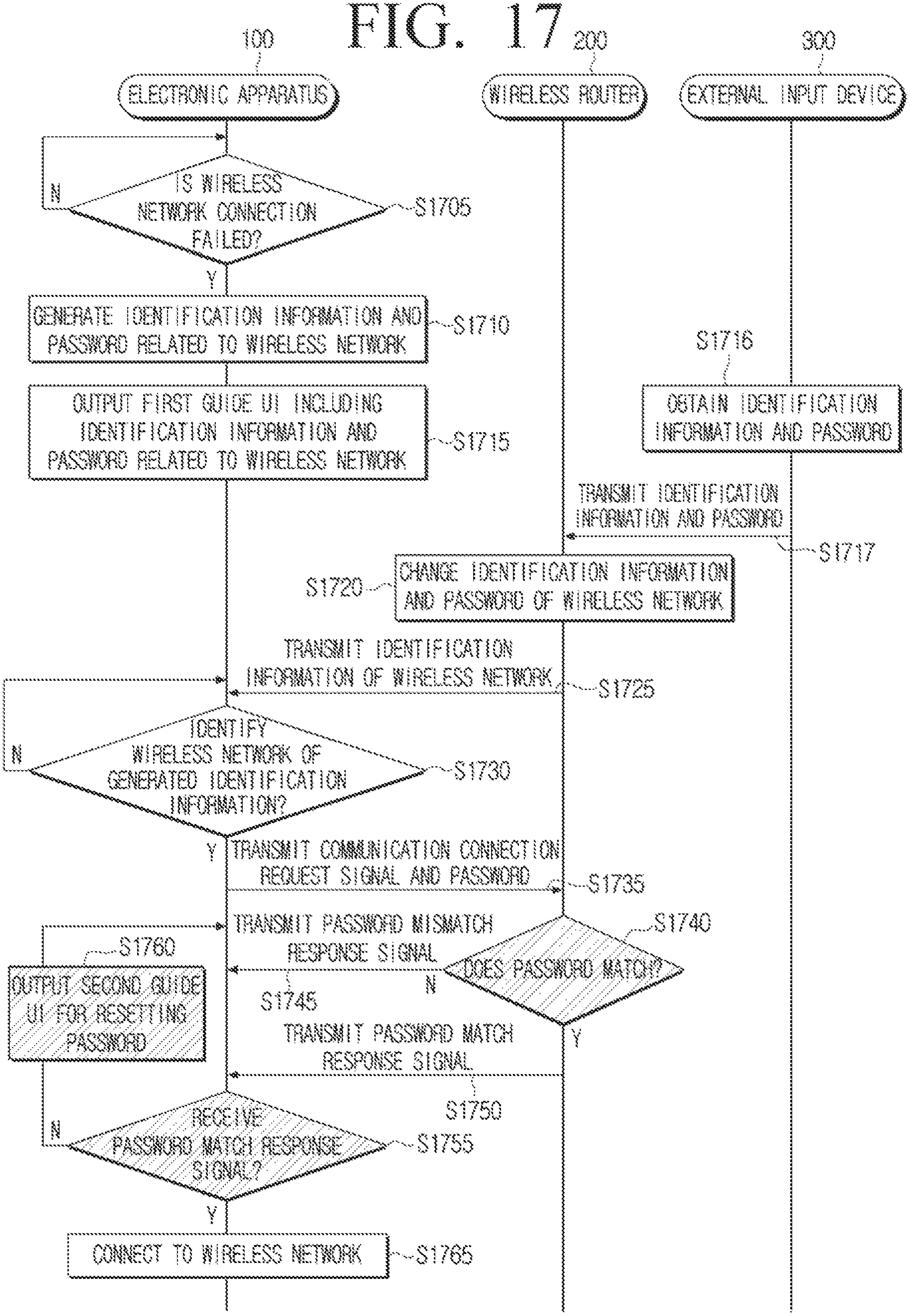
FIG. 17 is a flowchart provided to explain an operation of controlling to provide a guide UI for resetting a password according to an embodiment.

FIG. 17 is a flowchart provided to explain an operation of controlling to provide a guide UI for resetting a password.

Referring to FIGS. 17, S1705, S1710, S1715, S1720, S1725, S1730, S1735, S1740, S1745, S1750, S1755, S1760, and S1765 correspond to S1505, S1510, S1515, S1520, S1525, S1530, S1535, S1540, S1545, S1550, S1555, S1560, of S1565 of FIG. 15 and thus, the overlapping description will be omitted.

Here, the wireless router 200 may obtain identification information and a password of a wireless network from the external input device 300. Specifically, the external input device 300 may obtain identification information and a password of a wireless network (S1716). Subsequently, the external input device 300 may transmit the obtained identification information and password to the wireless router 200 (S1717).

When receiving the identification information and password from the external input device 300, the wireless router 200 may change the identification information and password of the wireless network based on the received identification information and password (S1720).

FIG. 18 is a flowchart provided to explain an operation of connecting to the wireless router 200 using a similarity between identification information that is randomly generated and identification information of a searched wireless network.

Referring to FIGS. 18, S1805, S1810, S1815, and S1820 may correspond to S1305, S1310, and S1315 of FIG. 13 and thus, the overlapping description will be omitted.

Here, after the first guide UI is provided (or output), the electronic apparatus 100 may identify the wireless network of the generated identification information (S1820). When the wireless network of the generated identification information is identified (or it exists) (S1820—Y), the electronic apparatus 100 may be connected to the wireless network (S1825).

When the generated wireless network is not identified (or it does not exist) (S1820—N), the electronic apparatus 100 may obtain a similarity between the generated identification information and the identification information of the identified wireless network (S1830). Subsequently, the electronic apparatus 100 may identify whether the obtained similarity is equal to or greater than a threshold value (S1835). When the similarity is less than the threshold value, the electronic apparatus 100 may not be connected to the wireless network.

Here, when the similarity is equal to or greater than the threshold value, the electronic apparatus 100 may output the third guide UI for asking whether to connect to a wireless network having the similarity equal to or greater than the threshold value (S1840). Here, the third guide UI is illustrated in detail in FIG. 19.

After the third guide UI is provided (or output), the electronic apparatus 100 may identify whether a user input for connecting to a wireless network is received (S1845). Here, the user input may be an input received according to the third guide UI. When a user input for connecting to a wireless network is not received (S1845—N), the electronic apparatus 100 may not be connected to the wireless network.

When a user input for connecting to a wireless network is received (S1845—Y), the electronic apparatus 100 may be connected to the wireless network (S1825).

FIG. 19 is a view provided to explain a guide UI for connecting to a wireless network searched using a similarity.

Referring to FIG. 19, the electronic apparatus 100 may output a guide UI 1900. Here, the guide UI 1900 may include a UI 1901 including information indicating that a wireless network having the same identification information as the generated identification information cannot be searched, a UI 1902 including information indicating that a wireless network having identification information similar to the generated identification information is searched, a UI 1903 for selection to connect to a wireless network having identification information similar to the generated identification information, or a UI 1904 for selection not to connect to a wireless network having identification information similar to the generated identification information.

Here, the guide UI 1900 may mean the third guide UI.

Meanwhile, the electronic apparatus 100 may output the guide UI 1910. Here, the guide UI 1910 may include a UI 1911 requesting to confirm the input wireless network information. For example, a user may incorrectly enter some of the identification information and password of the wireless network. Here, when a similarity between the generated information (at least one of the identification information or password) and the information input by the user (the input identification information or the input password) is equal to or greater than a threshold value, the electronic apparatus 100 may output the guide UI 1910. Although not completely identical, if the similarity is equal to or greater than the threshold value, it can be seen that the user clearly enters some of the information incorrectly. Accordingly, the electronic apparatus 100 may guide the user to change the incorrectly-entered information through the guide UI 1910.

FIG. 20 a flowchart provided to explain an operation of dividing a wireless network into a plurality of groups.

Referring to FIG. 20, the electronic apparatus 100 may be supplied with power based on a power unit included in the electronic apparatus 100 (S2005). The electronic apparatus 100 may be connected to a wireless network based on a plurality of groups. Here, a group may be a unit for classifying a wireless network based on a predetermined condition. The first group may include a wireless network pre-connected to the electronic apparatus 100. The second group may include a public wireless network that can be automatically connected without a password. The third group may include a wireless network corresponding to identification information generated by the electronic apparatus 100.

Here, the electronic apparatus 100 may determine whether a pre-stored wireless network included in the first group is identified (S2010). When a wireless network included in the first group is identified (or it exists) (S2010—Y), the electronic apparatus 100 may be connected to the wireless network of the first group (S2015).

Here, when a wireless network included in the first group is not identified (or it does not exist) (S2010—N), the electronic apparatus 100 may identify whether an automatically connectable public wireless network is identified (S2020). Here, when a wireless network included in the second group is identified (or it exists) (S2020—Y), the electronic apparatus 100 may be connected to the wireless network of the second group (S2025).

Here, when a wireless network included in the second group is not identified (or it does not exist) (S2020—N), the electronic apparatus 100 may generate identification information and a password related to a wireless network (S2030). Subsequently, the electronic apparatus 100 may determine whether a wireless network of the generated identification information included in the third group is identified (S2035). Here, when a wireless network of the third group is identified (or it exists) (S2035—Y), the electronic apparatus 100 may be connected to the wireless network of the third group (S2040). Here, when a wireless network of the third group is not identified (or it does not exist) (S2035—N), the electronic apparatus 100 may perform the operation of identifying a wireless network of the third group repeatedly.

FIG. 21 is a view provided to explain a guide UI indicating whether a wireless network included in a plurality of groups is connected.

Referring to FIG. 21, the electronic apparatus 100 may output a guide UI 2100 including a wireless network identification result (or a search result) related to a plurality of groups. Here, the guide UI 2100 may include at least one of a UI 2102 indicating a wireless network identification result of the first group, a UI 2102 indicating a wireless network identification result of the second group, or a UI 2103 indicating a wireless network identification result of the third group.

Figure 22:
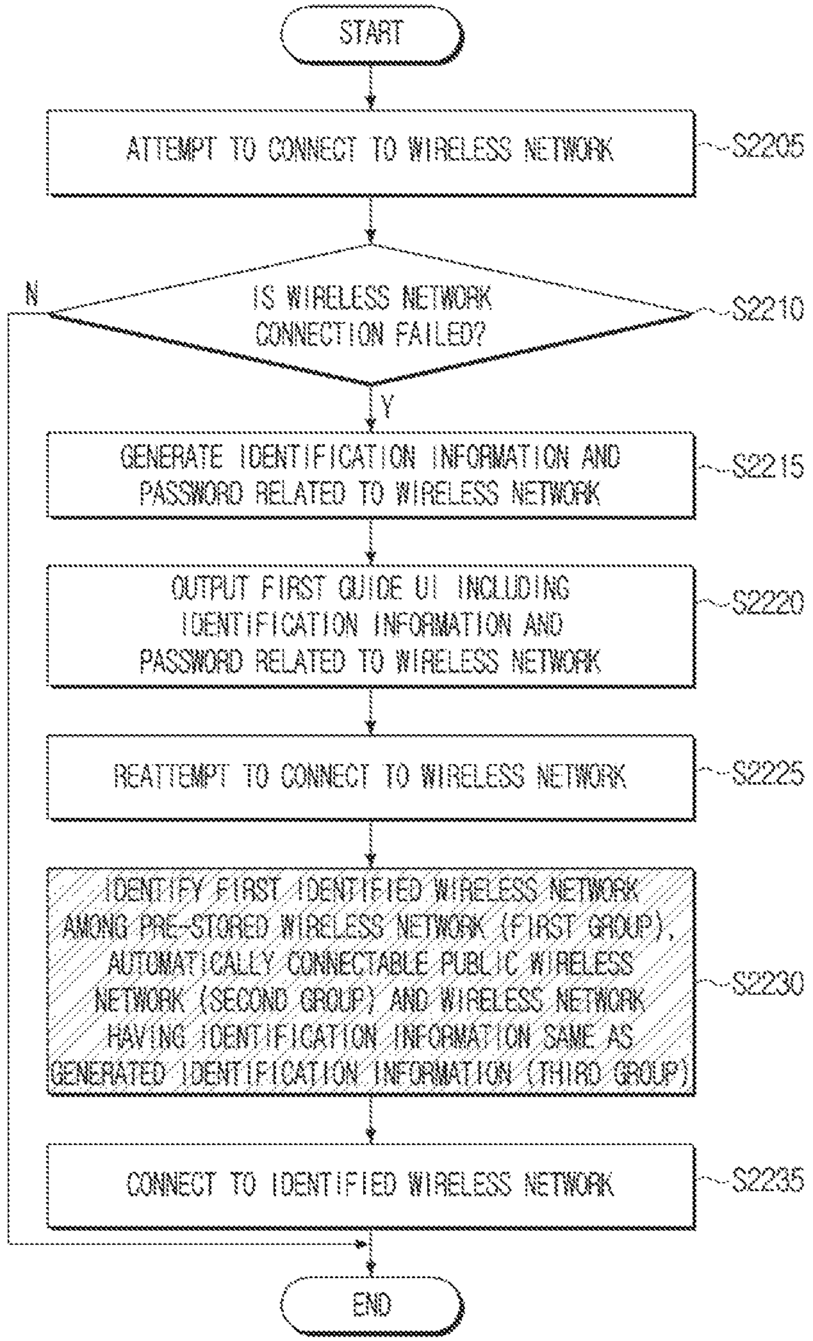
FIG. 22 is a flowchart provided to explain an operation of connecting to a wireless router using a search point in a plurality of groups according to an embodiment.

FIG. 22 is a flowchart provided to explain an operation of connecting to the wireless router 200 using a search point in a plurality of groups.

Referring to FIG. 22, the electronic apparatus 100 may attempt to connect to a wireless network (S2205). Subsequently, the electronic apparatus 100 may identify whether the connection to a wireless network has failed (S2210). When the connection to a wireless network does not fail (S2210—N), the electronic apparatus 100 may be connected to the existing wireless network or may be automatically connected to the wireless network in a general method.

When the connection to a wireless has failed (S2210—Y), the electronic apparatus 100 may generate identification information and a password related to a wireless network (S2215). In addition, the electronic apparatus 100 may output the first guide UI including the identification information and password related to the wireless network (S2220). Subsequently, the electronic apparatus 100 may reattempt to connect to the wireless network (S2225). Here, the reattempt operation may mean the operation of identifying a wireless network having identification information identical or similar to the generated information in S2215.

Here, the electronic apparatus 100 may identify a wireless network that is first identified from among a pre-stored wireless network (the first group), an automatically connectable public wireless network (the second group) or a wireless network identical to (or similar to) the generated identification information (the third group) (S2230). Subsequently, the electronic apparatus 100 may be connected to the wireless network that is first identified (S2235).

Figure 23:
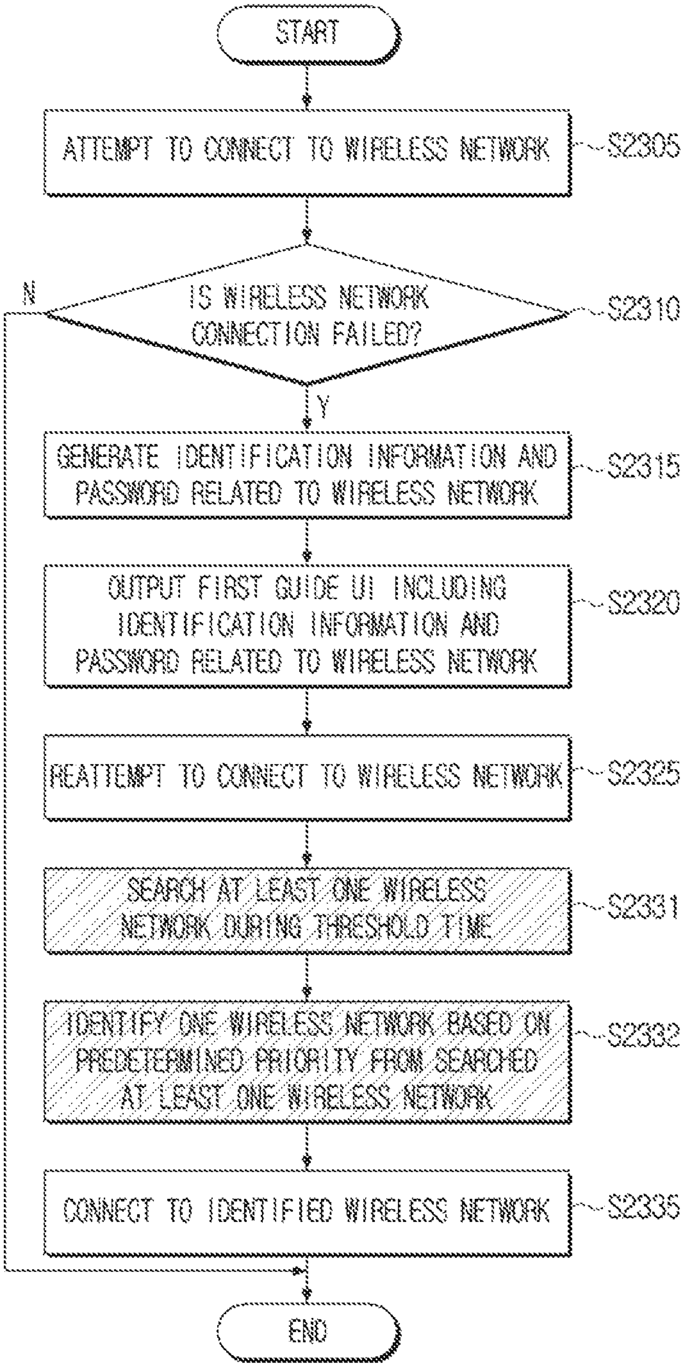
FIG. 23 is a flowchart provided to explain an operation of connecting to a wireless router according to a priority of a plurality of groups according to an embodiment.

FIG. 23 is a flowchart provided to explain an operation of connecting to the wireless router 200 according to a priority of a plurality of groups.

Referring to FIGS. 23, S2305, S2310, S2315, S2320, S2325, and S2335 may correspond to S2205, S2210, S2215, S2220, S2225, and S2235 and thus, the overlapping description will be omitted.

Through the step of S2325, the operation of reattempting to connect to a wireless network is performed, and the electronic apparatus 100 may search (or identify) at least one wireless network for a threshold time (e.g., 30 seconds) (S2331).

The electronic apparatus may identify at least one wireless network based on a predetermined priority from among the at least one searched wireless network (S2332). Here, the predetermined priority may mean at least one of whether there is pre-connection, the number of pre-connections and signal strength.

Subsequently, the electronic apparatus 100 may be connected to the wireless network identified in the step of S2332 (S2335).

FIG. 24 is a flowchart provided to explain an operation of connecting to the wireless router 200 using a list including a plurality of wireless networks.

Referring to FIGS. 24, S2405, S2410, S2415, S2420, S2425, and S2435 may correspond to S2205, S2210, S2215, S2220, S2225, and S2235 of FIG. 22 and thus, the overlapping description will be omitted.

Through the step of S2425, the operation of reattempting to connect to a wireless network is performed, and the electronic apparatus 100 may search (or identify) at least one wireless network for a threshold time (e.g., 30 seconds) (S2431).

The electronic apparatus 100 may output the third guide UI including identification information of the at least one searched wireless network (S2432). Here, the third guide UI may obtain the identification information of the searched wireless network, and output the identification information of the obtained wireless network through the third guide UI. Subsequently, the electronic apparatus 100 may receive a user input through the third UI that is provided (or output).

The electronic apparatus 100 may identify one wireless network based on the user input (S2433).

Subsequently, the electronic apparatus 100 may be connected to the wireless network identified in the step of S2433 (S2435).

FIG. 25 is a view provided to explain a list including a plurality of wireless networks.

Referring to FIG. 25, the electronic apparatus 100 may output a guide UI 2500. Here, the guide UI 2500 may include at least one of a UI 2510 including guide contents for selecting a searched wireless network or a UI 2520 including detailed information corresponding to the searched wireless network.

Here, the UI 2520 including detailed information corresponding to the searched wireless network may include at least one of identification information of the wireless network, group information or a UI for a user input.

Figure 26:
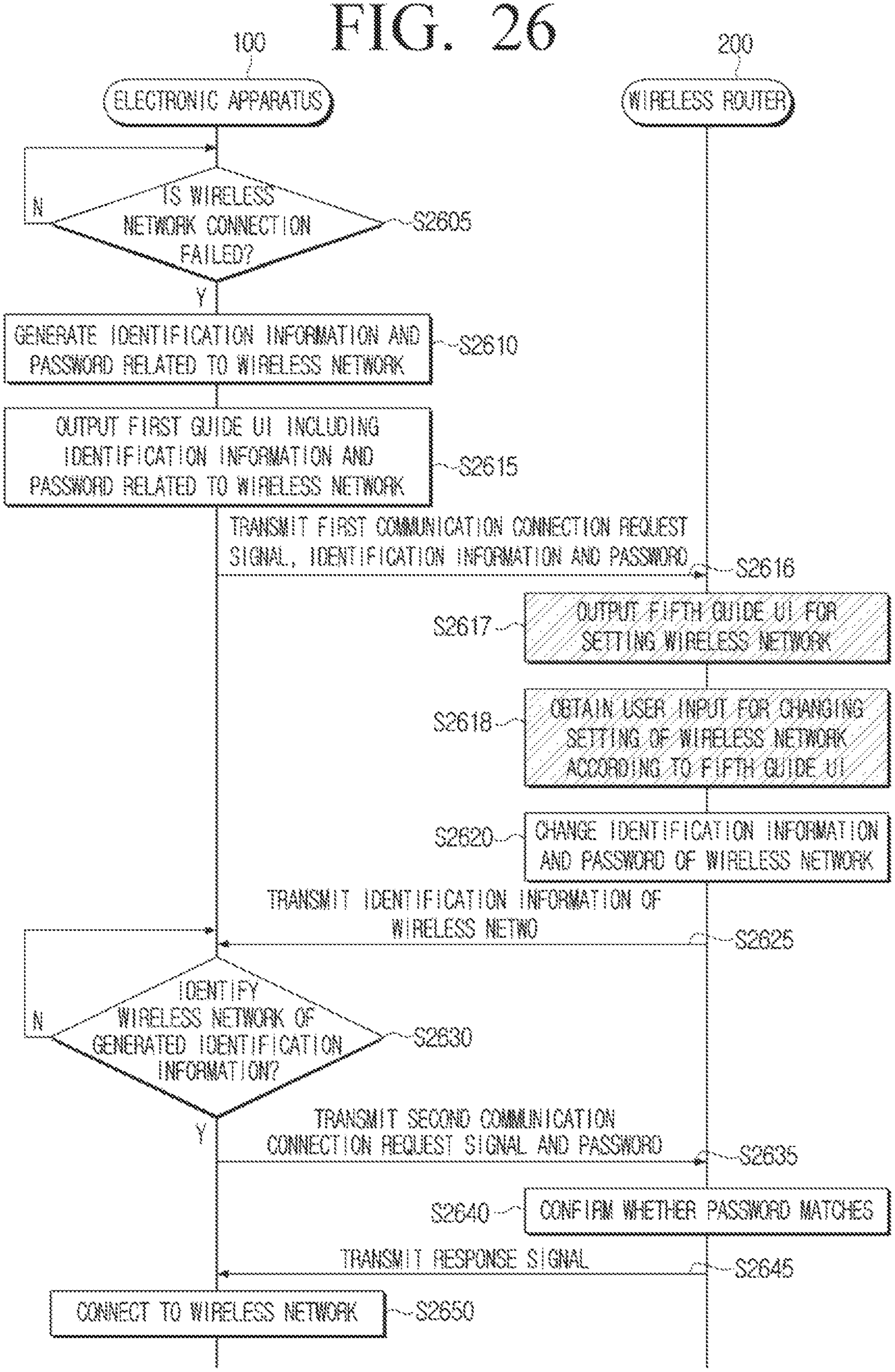
FIG. 26 is a flowchart provided to explain an operation of connecting to a wireless router without a user directly entering a password according to an embodiment.

FIG. 26 is a flowchart provided to explain an operation of connecting to the wireless router 200 without a user directly entering a password.

Referring to FIGS. 26, S2605, S2610, S2615, S2620, S2625, S2630, S2635, S2640, S2645, and S2650 may correspond to S1305, S1310, S1315, S1320, S1325, S1330, S1335, S1340, S1345, and S1350 of FIG. 13 and thus, the overlapping description will be omitted.

After outputting the first guide UI according to the step of S2615, the electronic apparatus 100 may transmit the first communication connection request signal, the identification information generated in the step of S2610 and a password to the wireless router 200 (S2616).

When receiving the first communication connection request signal from the electronic apparatus 100, the wireless router 200 may output the fifth guide UI (S2617). Here, the fifth guide UI may include the identification information and password received from the electronic apparatus 100. Here, the fifth guide UI is illustrated in detail in FIG. 27.

The wireless router 200 may obtain a user input for changing the setting of the wireless network according to the fifth guide UI (S2618).

The wireless router 200 may change the identification information of the wireless network and the wireless network based on the user input (S2620). Specifically, the wireless router 200 may change the previously set first identification information and the first password to the second identification information and the second password. Here, the second identification information and the second password may mean the identification information and password generated in the step of S2610.

In the embodiment of FIG. 26, the user does not have to directly enter the identification information and password of the wireless network to be changed and thus, user convenience can be improved.

Figure 27:
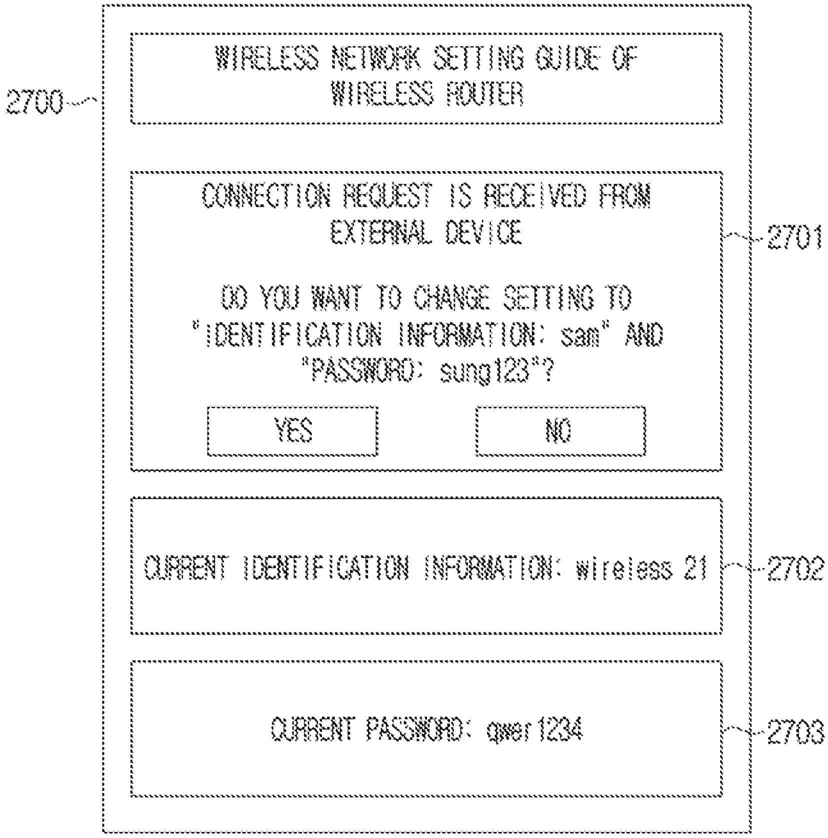
FIG. 27 is a view provided to explain a guide UI for changing identification information and a password of a wireless network without a user directly entering a password according to an embodiment.

FIG. 27 is a view provided to explain a guide UI for changing identification information and a password of a wireless network without a user directly entering a password.

Referring to FIG. 27, the wireless router 200 may output a guide UI 2700. Here, the guide UI 2700 may include at least one of a UI 2701 informing that there is a connection request from an external device (e.g., the electronic apparatus 100) and asking whether to change setting information, a UI 2702 indicating the currently set identification information, or a UI 2703 indicating the currently set password.

Here, the guide UI 2700 may mean the fifth guide UI.

In this case, the UI 2701 may include the identification information and password received from the electronic apparatus 100, and may include contents requesting a user input for changing the setting. Here, when the user inputs only a final command for the change without entering the identification information and password of the wireless network separately, the identification information and password of the wireless network can be changed automatically.

Figure 28:
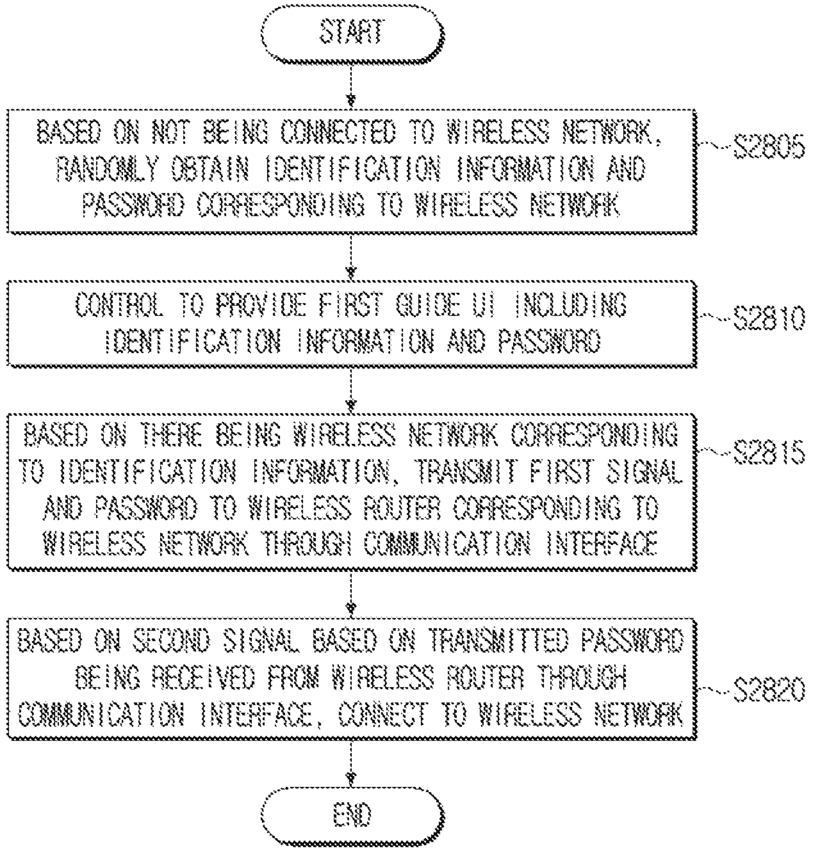
FIG. 28 is a flowchart provided to explain a controlling operation of an electronic apparatus according to an embodiment.

FIG. 28 is a flowchart provided to explain a controlling operation of the electronic apparatus 100 according to an embodiment.

Referring to FIG. 28, a controlling method of an electronic apparatus includes, when not connected to a wireless network, randomly obtaining identification information and a password corresponding to a wireless network (S2805), controlling (or outputting) to provide the first guide UI including the identification information and password (S2810), when there is a wireless network corresponding to the identification information, transmitting a first signal (or a communication connection request signal) and a password to a wireless router corresponding to the wireless network (S2815), and when a response signal generated based on the transmitted password is received from the wireless router, connecting to the wireless network provided by the wireless router (S2820).

Meanwhile, the first guide UI may include information for guiding a user to set identification information and a password as the identification information and password of the wireless network provided by the wireless router.

Meanwhile, the password of the wireless network provided by the wireless router may be a password which is changed after the first guide UI is provided (or output).

Meanwhile, the password of the wireless network provided by the wireless router may be a password transmitted to the wireless router from an external input device connected to the wireless router.

Meanwhile, the controlling method may further include searching at least one wireless network around the electronic apparatus in order to identify a wireless network corresponding to identification information.

Meanwhile, the response signal is the first response signal (or the second signal) generated when the transmitted password matches the password of the wireless network, and the controlling method may further include, based on the third signal generated when the transmitted password does not match the identification information of the wireless network being received from the wireless router, controlling to provide the second guide UI including information for guiding the user to reset the password.

Meanwhile, the electronic apparatus may store the first group including at least one wireless network pre-connected to the electronic apparatus, and the controlling method may further include, based on there being at least one public wireless network connectable to the electronic apparatus, storing the at least one public wireless network in the second group, based on there being a wireless network corresponding to the identification information, storing the wireless network corresponding to the identification information in the third group, and identifying a connectable wireless network based on at least one of the first group, the second group or the third group.

Meanwhile, the identifying a connectable wireless network may include, based on there not being a connectable wireless network in the first group, identifying a connectable wireless network in the second group, and based on there not being a connectable wireless network, identifying a connectable wireless network in the third group.

Meanwhile, the controlling method may further include, based on there being at least one wireless network, obtaining a similarity between the identification and the identification of the identified at least one wireless network, based on the similarity being equal to or greater than a threshold value, controlling to provide the third guide UI including identification information of a wireless network having a similarity equal to or greater than the threshold value, and based on a user input for selecting a wireless network according to the provided (or output) third guide UI being received, transmitting the first signal (or the communication connection request signal) and password to the wireless router corresponding to the selected wireless network.

Meanwhile, the controlling to provide the third guide UI may include, based on there being a plurality of wireless networks having a similarity equal to or greater than the threshold value, outputting the third guide UI including identification information of each of the plurality of wireless networks based on the similarity corresponding to each of the plurality of wireless networks.

Meanwhile, the methods according to the diverse embodiments of the disclosure described above may be implemented in the form of an application that may be installed in an existing display apparatus.

In addition, the methods according to the diverse embodiments of the disclosure described above may be implemented only by software upgrade or hardware upgrade for the existing display apparatus.

Further, the diverse embodiments of the disclosure described above may also be performed through an embedded server included in the display apparatus or at least one external server.

Meanwhile, according to an embodiment, the various embodiments of the disclosure may be implemented as software including instructions stored in machine-readable storage media, which can be read by machines (e.g.: computers). The machine refers to a device that can call instructions stored in a storage medium, and can operate according to the called instructions, and the device may include an electronic apparatus according to the embodiments described in the disclosure. When the instructions are executed by the processor, the processor may perform functions corresponding to the instructions by itself, or by using other components under its control. An instruction may include a code that is generated or executed by a compiler or an interpreter. A storage medium that is readable by machines may be provided in the form of a non-transitory storage medium. Here, 'a non-transitory' storage medium only means that the device is a tangible device, and does not include a signal, and the term does not distinguish a case wherein data is stored semi-permanently in a storage medium and a case wherein data is stored temporarily.

According to an embodiment of the disclosure, the method according to the various embodiments described in the disclosure may be provided while being included in a computer program product. The computer program product is a product, and it can be traded between a seller and a buyer. The computer program product can be distributed in the form of a storage medium that is readable by machines (e.g.: a compact disc read only memory (CD-ROM)), or distributed on-line through an application store (e.g.: Play Store™). In the case of on-line distribution, at least a portion of the computer program product may be stored in a storage medium such as the server of the manufacturer, the server of the application store, or the memory of the relay server at least temporarily, or may be generated temporarily.

In addition, each of the components according to the aforementioned various embodiments (e.g.: a module or a program) may consist of a singular object or a plurality of objects. In addition, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order, or omitted, or other operations may be added.

While preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are not to be interpreted independently from the technical idea or prospect of the disclosure.

What is claimed is:

1. An electronic apparatus comprising:

a communication interface; and a processor, including circuitry, configured to:

based on the electronic apparatus being identified as having no wireless network connection through available wireless routers, randomly obtain identification information and a password, for connection with a wireless network connected through a wireless router among the available wireless routers, through the communication interface and output a guide User Interface (UI) to provide the randomly obtained identification information and the password, the randomly obtained identification information and the password being applied to settings of the wireless network provided by the wireless router according to a user input through the guide UI, determine whether the wireless network is identifiable through a search of the available wireless routers based on the randomly obtained identification information provided through the guide UI, based on the wireless network being identified according to the randomly obtained identification information received from the wireless router, transmit, through the communication interface, a first signal requesting the wireless network connection and the password to the wireless router of the wireless network, and based on a second signal generated according to the transmitted password being received from the wireless router through the communication interface, connect the electronic apparatus to the wireless network provided by the wireless router, wherein the guide UI includes information corresponding to set the identification information and the password as identification information and a password of the wireless network provided by the wireless router, and wherein the second signal is corresponding to a signal generated based on the transmitted password being consistent with the password of the wireless network.

2. The electronic apparatus as claimed in claim 1, wherein the password of the wireless network is changed using the guide UI through which the randomly obtained identification information and the password is provided.

3. The electronic apparatus as claimed in claim 1, wherein the password of the wireless network is transmitted to the wireless router from an external input device connected to the wireless router.

4. The electronic apparatus as claimed in claim 1, wherein the processor searches among wireless networks around the electronic apparatus to identify at least one wireless network identifiable according to the randomly obtained identification information.

5. The electronic apparatus as claimed in claim 1, wherein the guide UI is a first guide UI; and wherein the processor is configured to:

based on a third signal generated when the transmitted password is inconsistent with the identification information of the wireless network from the wireless router through the communication interface, control to provide a second guide UI including information guiding a user to reset the password.

6. The electronic apparatus as claimed in claim 1, further comprising:

a memory configured to store a first group including at least one wireless network pre-connected to the electronic apparatus, wherein the processor is configured to:

based on there being at least one public wireless network connectable to the electronic apparatus, store information of the at least one public wireless network in the memory as a second group;

based on the wireless network corresponding to the identification information, store information of wireless network corresponding to the identification information in the memory as a third group; and identify a connectable wireless network based on at least one of the first group, the second group, or the third group.

7. The electronic apparatus as claimed in claim 6, wherein the processor is configured to:

based on there not being a connectable wireless network in the first group, identify a connectable wireless network in the second group; and based on there not being a connectable wireless network in the second group, identify a connectable wireless network in the third group.

8. The electronic apparatus as claimed in claim 1, wherein the processor is configured to:

based on there being at least one wireless network, obtain a similarity between the identification information and identification information of the at least one wireless network;

based on the similarity being equal to or greater than a threshold value, control another guide UI to provide identification information of a wireless network having a similarity equal to or greater than a threshold value; and based on a user input for selecting a wireless network being received according to the provided other guide UI, transmit the first signal and the password to a wireless router corresponding to the selected wireless network through the communication interface.

9. The electronic apparatus as claimed in claim 8, wherein the processor is configured to, based on there being a plurality of wireless networks having the similarity equal to greater than the threshold value, control the other guide UI to provide identification information of each of the plurality of wireless networks based on a similarity corresponding to each of the plurality of wireless networks.

10. A controlling method of an electronic apparatus, comprising:

based on the electronic apparatus being identified as having no wireless network connection through available wireless routers, randomly obtaining identification information and a password for wireless network connection with a wireless network connected through a wireless router among the available wireless routers;

outputting a guide User Interface (UI) to provide the identification information and the password, the randomly obtained identification information and the password being applied to settings of the wireless network provided by the wireless router according to a user input through the guide UI;

determine whether the wireless router of the wireless network is identifiable through a search of the available wireless routers based on the randomly obtained identification information provided through the guide UI, based on the wireless network being identifiable according to the randomly obtained the identification information received from the wireless router, transmitting a first signal requesting the wireless network connection and the password to the wireless router of the wireless network; and based on a second signal generated according to the transmitted password being received from the wireless router through a communication interface, connecting the electronic apparatus to the wireless network provided by the wireless router, wherein the guide UI includes information corresponding to set the identification information and the password as identification information and a password of the wireless network provided by the wireless router, and wherein the second signal is corresponding to a signal generated based on the transmitted password being consistent with the password of the wireless network.

11. The controlling method as claimed in claim 10, wherein the password of the wireless network is changed using the guide UI through which the randomly obtained identification information and the password is provided.

12. The controlling method as claimed in claim 10, wherein the password of the wireless network is transmitted to the wireless router from an external input device connected to the wireless router.

13. The controlling method as claimed in claim 10, further comprising:

searching among wireless networks around the electronic apparatus to identify at least one wireless network corresponding to the identification information.

14. A system including an electronic apparatus and a wireless router, comprising:

the electronic apparatus which is configured to:

based on the electronic apparatus being identified as having no wireless network connection through available wireless routers, randomly obtain identification information and a password, for connection with a wireless network connected through a wireless router among the available wireless routers and output a guide User Interface (UI) to provide the randomly obtained identification information and the password, the wireless router which is configured to:

receive a user input for inputting the randomly obtained identification information and the password, change settings of the wireless network based on the randomly obtained identification information and the password received by the user input, and transmit the randomly obtained identification information changed by the user input to the electronic apparatus, wherein the electronic apparatus is configured to:

receive the randomly obtained identification information changed by the user input from the wireless router, determine whether the wireless network is identifiable through a search of the available wireless routers based on the randomly obtained identification information provided through the guide UI, and based on the wireless network being identified according to the randomly obtained identification information received from the wireless router, transmit a first signal requesting the wireless network connection and the password to the wireless router of the wireless network;

wherein the wireless router is configured to:

receive the first signal requesting the wireless network connection and the password to the wireless router of the wireless network, based on the received password being consistent with the password of the wireless network, generate a second signal indicating a password match response signal, and transmit the second signal to the electronic apparatus, wherein the electronic apparatus is configured to:

receive the second signal, and based on the second signal generated according to the transmitted password being received from the wireless router, connect the electronic apparatus to the wireless network provided by the wireless router, wherein the guide UI includes information corresponding to set the identification information and the password as identification information and a password of the wireless network provided by the wireless router.

* * * * *